US012049080B2

(12) United States Patent
Ohtani

(10) Patent No.: US 12,049,080 B2
(45) Date of Patent: Jul. 30, 2024

(54) LIQUID DISCHARGE METHOD, NON-TRANSITORY RECORDING MEDIUM, AND LIQUID DISCHARGE APPARATUS

(71) Applicant: Masaharu Ohtani, Kanagawa (JP)

(72) Inventor: Masaharu Ohtani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 101 days.

(21) Appl. No.: 18/047,719

(22) Filed: Oct. 19, 2022

(65) Prior Publication Data

US 2023/0130748 A1 Apr. 27, 2023

(30) Foreign Application Priority Data

Oct. 26, 2021 (JP) ................................ 2021-174367

(51) Int. Cl.

| | |
|---|---|
| ***B41J 2/045*** | (2006.01) |
| ***B41J 11/00*** | (2006.01) |
| *B41J 2/165* | (2006.01) |
| *B41J 3/407* | (2006.01) |

(52) U.S. Cl.
CPC ....... *B41J 2/04573* (2013.01); *B41J 2/04541* (2013.01); *B41J 2/04543* (2013.01); *B41J 11/0095* (2013.01); *B41J 2/16508* (2013.01); *B41J 2/16514* (2024.05); *B41J 2/16526* (2013.01); *B41J 2/16532* (2013.01); *B41J 2/16535* (2013.01); *B41J 3/4078* (2013.01)

(58) Field of Classification Search
CPC ................ B41J 2/04573; B41J 2/04541; B41J 2/04543; B41J 11/0095; B41J 2/16508; B41J 2/16526; B41J 2/16532; B41J 2/16535; B41J 2002/16514; B41J 3/4078
See application file for complete search history.

(56) References Cited

U.S. PATENT DOCUMENTS

| | | | | |
|---|---|---|---|---|
| 2011/0057971 | A1 | 3/2011 | Yokoyama et al. | |
| 2020/0101769 | A1 | 4/2020 | Kunioka et al. | |
| 2020/0298591 | A1* | 9/2020 | Ueno | B41J 3/40731 |
| 2021/0016562 | A1* | 1/2021 | Noda | B41J 11/008 |

FOREIGN PATENT DOCUMENTS

| | | | | |
|---|---|---|---|---|
| JP | 2012-061694 | | 3/2012 | |
| JP | 2012061694 A | * | 3/2012 | B41J 2/2052 |
| JP | 2019-171642 | | 10/2019 | |

* cited by examiner

*Primary Examiner* — Yaovi M Ameh
(74) *Attorney, Agent, or Firm* — IPUSA, PLLC

(57) ABSTRACT

A liquid discharge method includes: calculating a first print time to print original image data on a print medium; generating rotated image data by rotating the original image data by a predetermined angle; calculating a second print time to print the rotated image data on the print medium; comparing the first print time and the second print time to determine whether the first print time is larger than the second print time; generating print image data according to the rotated image data in response to a determination in which the first print time is larger than the second print time; generating print image data according to the original image data in response to a determination in which the first print time is smaller than the second print time; and displaying a position and a direction of the print medium based on the print image data.

3 Claims, 19 Drawing Sheets

LIQUID DISCHARGE METHOD, NON-TRANSITORY RECORDING MEDIUM, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-174367, filed on Oct. 26, 2021, in the Japan Patent Office, the entire disclosure of which is hereby incorporated by reference herein.

BACKGROUND

Technical Field

The present disclosure relates to a liquid discharge method, a non-transitory recording medium, and a liquid discharge method.

Discussion of the Background Art

A printing system includes a liquid discharge apparatus such as a garment printer that discharges a liquid based on image data to print an image on a print media such as T-shirts, handkerchiefs, or socks, and an information processing apparatus that supplies image data to the liquid discharge apparatus.

In the information processing apparatus in the above printing system, an image printable in a short time is selected from an original image for printing a target image, an image obtained by rotating the original image by +90 degrees, and an image obtained by rotating the original image by −90 degrees in order to shorten a print time.

SUMMARY

A liquid discharge method includes: calculating a first print time to print original image data on a print medium; generating rotated image data by rotating the original image data by a predetermined angle; calculating a second print time to print the rotated image data on the print medium; comparing the first print time and the second print time to determine whether the first print time is larger than the second print time; generating print image data according to the rotated image data in response to a determination in which the first print time is larger than the second print time; generating print image data according to the original image data in response to a determination in which the first print time is smaller than the second print time; displaying a position and a direction of the print medium based on the print image data; and outputting the print image data to a liquid discharge apparatus to cause the liquid discharge apparatus to discharge a liquid onto the print medium based on the print image data.

A liquid discharge apparatus includes: a head configured to discharge a liquid onto a print medium based on image data, a placement member including a placement surface on which the print medium is to be placed; and circuitry configured to: calculating a first print time to print original image data on a print medium; generating rotated image data by rotating the original image data by a predetermined angle; calculating a second print time to print the rotated image data on the print medium; comparing the first print time and the second print time to determine whether the first print time is larger than the second print time; generating print image data according to the rotated image data in response to a determination in which the first print time is larger than the second print time; generating print image data according to the original image data in response to a determination in which the first print time is smaller than the second print time; displaying a position and a direction of the print medium based on the print image data; and outputting the print image data to a liquid discharge apparatus to cause the liquid discharge apparatus to discharge a liquid onto the print medium based on the print image data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
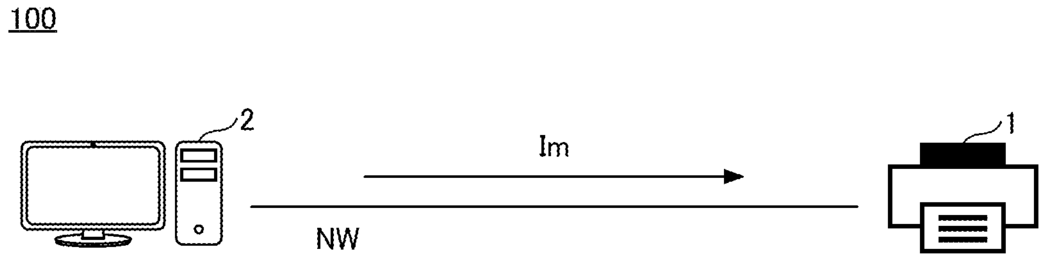
FIG. 1 is a diagram illustrating a general configuration example of a printing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Below, embodiments of the present disclosure are described in detail with reference to the accompanying drawings. In the drawings, like reference signs denote like elements, and overlapping description may be omitted where appropriate.

In the drawings described below, directions may be indicated by an X axis, a Y axis, and a Z axis. An X direction along the X axis indicates a main scanning direction that is a moving direction of a carriage included in a liquid discharge apparatus according to an embodiment, a Y direction along the Y axis indicates a sub-scanning direction that is a moving direction of a recording medium, and a Z direction along the Z axis indicates a direction orthogonal to both the main scanning direction and the sub-scanning direction. The Z direction is typically a vertical direction. In the embodiment described below, the Z direction is a direction along the direction of liquid discharge by the liquid discharge apparatus.

A direction in which the arrow is oriented in the X direction is referred to as a +X direction, a direction opposite to the +X direction is referred to as a −X direction, a direction in which the arrow is oriented in the Y direction is referred to as a +Y direction, and a direction opposite to the +Y direction is referred to as a −Y direction. In addition, a direction in which the arrow is oriented in the Z direction is referred to as a +Z direction, and a direction opposite to the +Z direction is referred to as a −Z direction. However, these terms do not limit the orientation of the liquid discharge apparatus in use, and the orientation of the liquid discharge apparatus is arbitrary.

Furthermore, in the terms of the embodiment, the image formation, recording, text printing, photo printing, printing, shaping, and the like are all synonymous.

Embodiment

Configuration Example of Printing System 100

FIG. 1 is a diagram illustrating a general configuration example of a printing system 100 according to a first embodiment.

The printing system 100 includes a liquid discharge apparatus 1 and an information processing apparatus 2.

The liquid discharge apparatus 1 prints an image on garments by an inkjet method of discharging image forming ink based on image data. The liquid discharge apparatus 1 can also be referred to as a garment printer.

Garments are an example of a print medium meaning fabric, clothes, clothing, costumes, or the like. Garments include T-shirts, which are shirts with no collar, handkerchiefs, socks, and the like. However, the print media according to the embodiment are not limited to garments.

The print media according to the embodiment mean a medium to which the ink discharged from the head can at least temporarily adhere, a medium to which the ink adheres and is fixed, a medium to which the ink adheres and permeates, and the like. Specific examples include recording media such as garments, paper, recording paper, recording sheets, and films, and include all those to which ink adheres unless otherwise specified in particular. The material of the print media may be paper, threads, fiber, cloth, leather, plastic, or the like as long as the ink can adhere thereto even temporarily.

The ink is an example of a liquid. However, the liquid according to the embodiment is not limited to the image forming ink. The liquid according to the embodiment means a liquid that realizes an intended function such as forming an image or a film. The liquid includes any liquid having a viscosity or a surface tension that is dischargeable from the liquid discharge head. Although there is no limitation in particular, preferably, the viscosity of the liquid is not greater than 30 mPa·s under ordinary temperature and ordinary pressure or by heating or cooling. More specific examples thereof include a solvent such as water or an organic solvent, a function-imparting material such as a dye, a pigment, a polymerizable compound, a resin, a functional material such as a surfactant, a suspension, and an emulsion.

The information processing apparatus 2 supplies image data Im to the liquid discharge apparatus 1. The information processing apparatus 2 is constructed by a computer such as a personal computer (PC). The information processing apparatus 2 is communicably connected to the liquid discharge apparatus 1 via a network NW such as the Internet or a local area network (LAN). The information processing apparatus 2 can supply the image data Im to the liquid discharge apparatus 1 by transmitting a print job including the image data Im to the liquid discharge apparatus 1.

However, the method of supplying the image data Im from the information processing apparatus 2 to the liquid discharge apparatus 1 is not limited to the method via the network NW. For example, the information processing apparatus 2 can supply the image data Im to the liquid discharge apparatus 1 via a portable storage medium such as a universal serial bus (USB) memory. The information processing apparatus 2 outputs the image data Im to a USB memory connected via an external device interface (I/F) and stores the image data Im in the USB memory. Thereafter, the USB memory is transported by a user of the printing system 100 (hereinafter, simply referred to as user) and then is connected to the liquid discharge apparatus 1 via an external device I/F provided in the liquid discharge apparatus 1. The liquid discharge apparatus 1 can acquire the image data Im by reading from the USB memory.

Configuration Example of Liquid Discharge Apparatus 1

Figure 2:
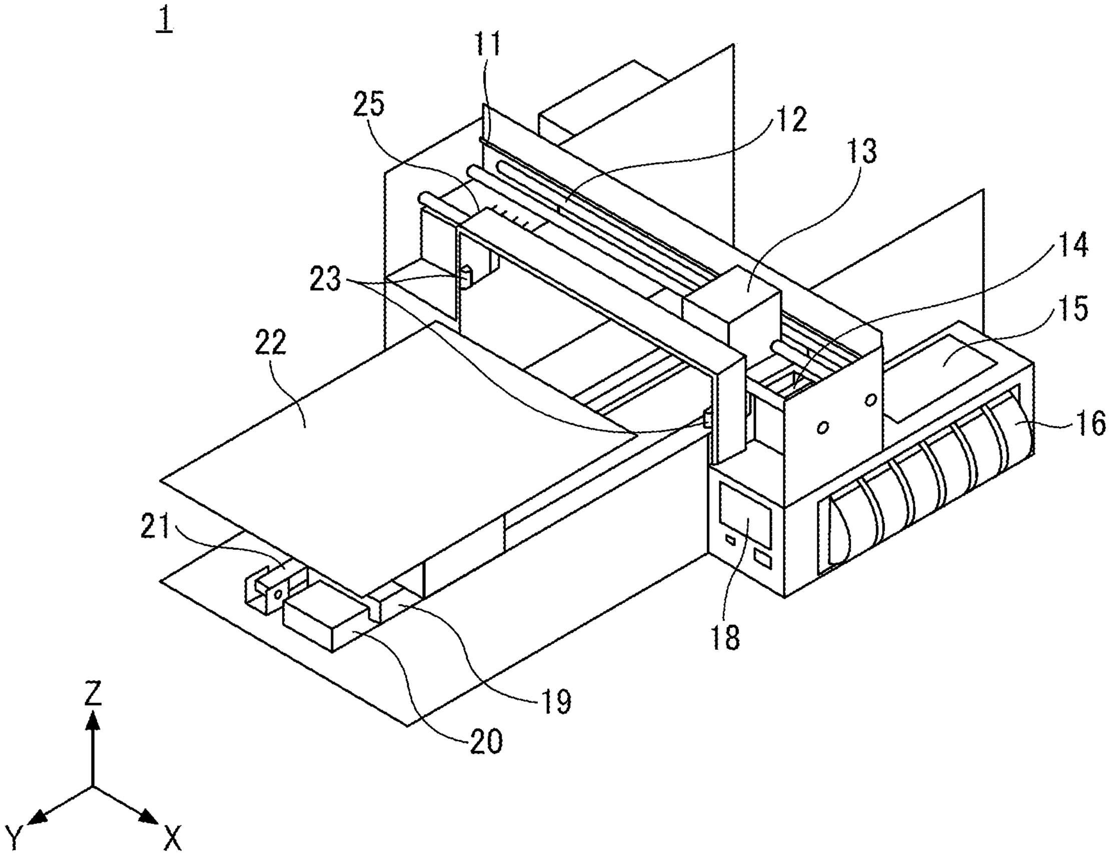
FIG. 2 is a perspective view of a configuration example of a liquid discharge apparatus according to the embodiment.
Figure 3:
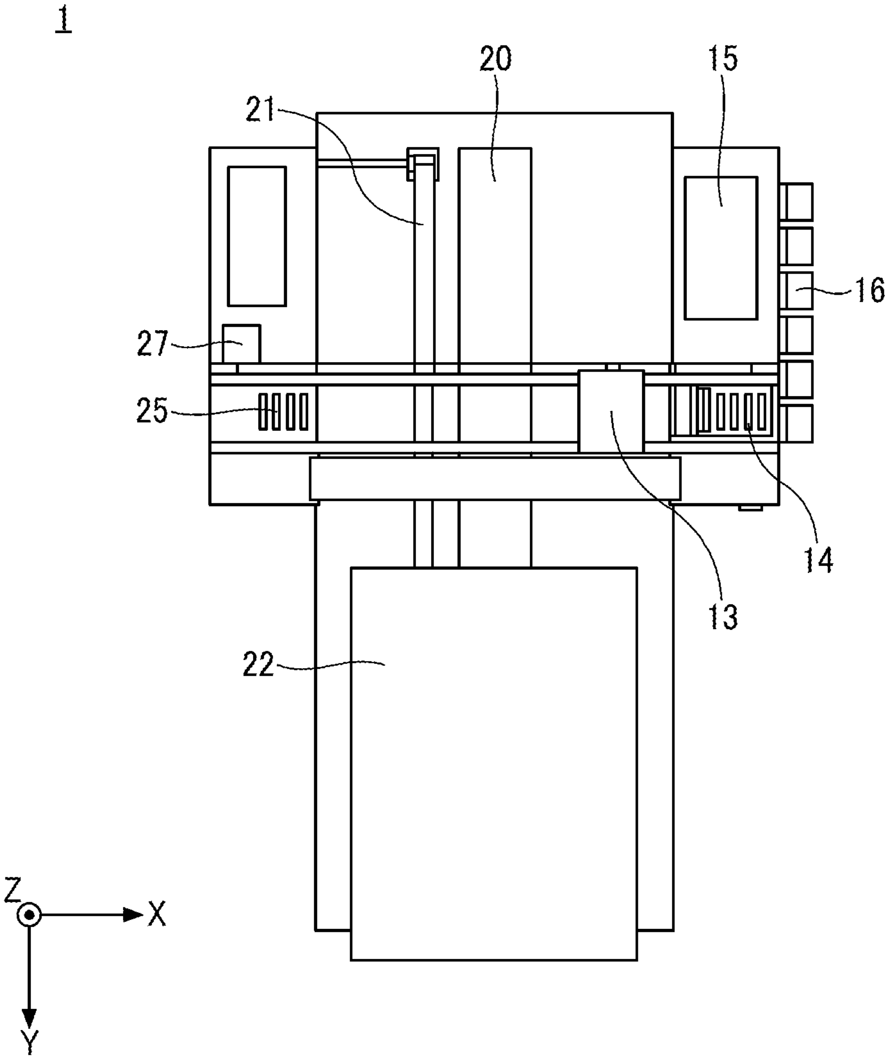
FIG. 3 is a top view of the configuration example of the liquid discharge apparatus according to the embodiment.
Figure 4:
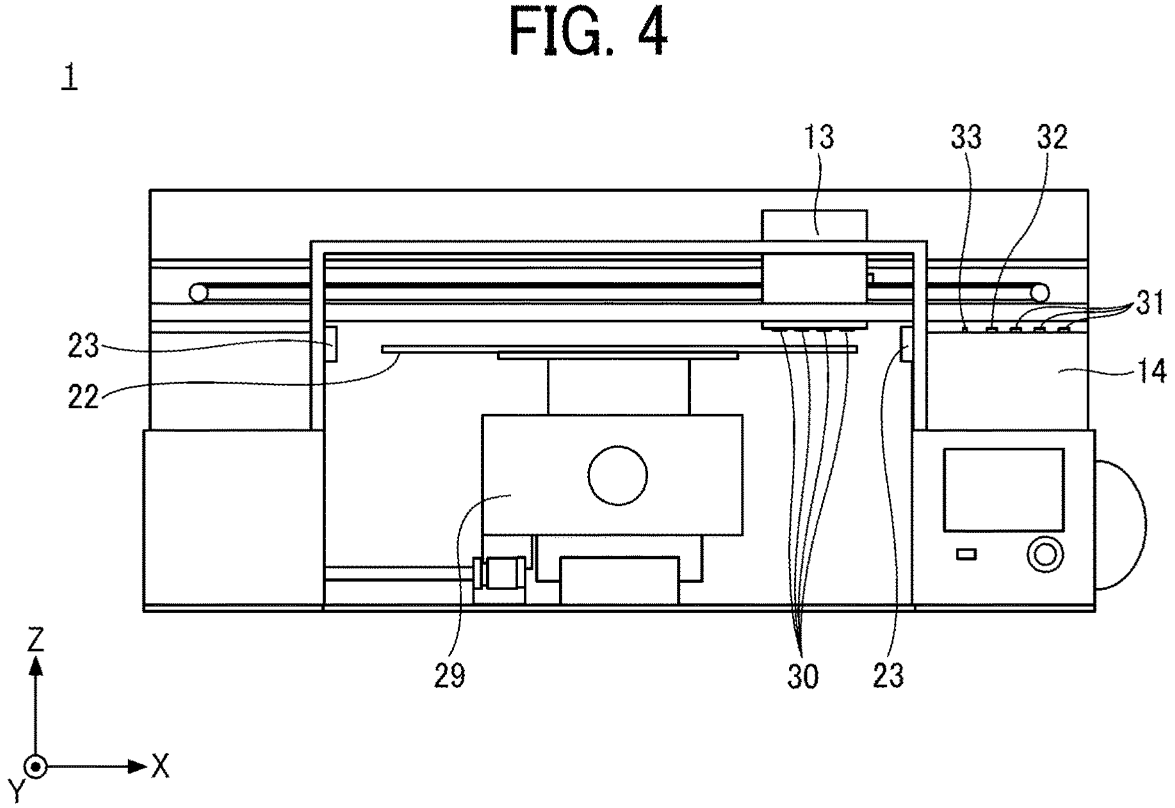
FIG. 4 is a front view of the configuration example of the liquid discharge apparatus according to the embodiment.

A configuration of the liquid discharge apparatus 1 will be described with reference to FIGS. 2 to 4. FIGS. 2 to 4 are diagrams illustrating a configuration of the liquid discharge apparatus 1, in which FIG. 2 is a perspective view, FIG. 3 is a top view, and FIG. 4 is a front view.

As illustrated in FIGS. 2 to 4, a carriage 13 on which a head 30 that discharges ink is mounted moves in each of the main scanning direction and the sub-scanning direction along a guide rod when a main scanning timing belt 12 is driven by a main scanning motor 27. At this time, in order to detect the position of the carriage 13, the liquid discharge apparatus 1 adjusts the timing at the discharge position while reading an encoder sheet 11 with periodic slits formed or printed by a sensor on the carriage 13, and causes the head 30 to discharge ink droplets according to a control signal from a controller board 15 to form an image.

Examples of the head 30 include heads using, as an energy generation source for discharging ink, a piezoelectric actuator (laminated piezoelectric element and thin film piezoelectric element), a thermal actuator with an electrothermal transducer such as a heating resistor, an electrostatic actuator including a diaphragm and a counter electrode, and the like.

Four heads 30 are mounted on the carriage 13, and each head 30 has two nozzle rows in which multiple nozzles is arranged in the sub-scanning direction. The liquid discharge apparatus 1 includes head tanks for temporarily storing ink to be used immediately above the heads 30 in the carriage 13. Each head tank is connected to an ink cartridge 16 via an ink supply tube and an ink supply pump, and can receive ink supply from the ink cartridge 16 as desired.

A garment as a print medium is placed on a platen 22. The platen 22 is an example of a placement member including a placement surface on which the garment is placed. The platen 22 is mounted on a platen lifting mechanism 29 and is adjustable in position in the vertical direction. The platen lifting mechanism 29 is mounted on a sub-scanning slider 19. The slider 19 is controlled by a sub-scanning timing belt 21, a sub-scanning driving mechanism, and a controller board 15 along a sub-scanning guide rail 20, so as to be movable in the sub-scanning direction.

When printing an image on the garment, the liquid discharge apparatus 1 operates according to the following procedure.

First, the garment is placed on the platen 22.

Subsequently, the liquid discharge apparatus 1 moves the slider 19 to pull the platen 22 in the −Y direction in response to an operation performed on the operation panel 18. At the time of the pulling, the liquid discharge apparatus 1 detects whether the garment on the platen 22 will collide with the heads 30 by a height detection sensor 23. When determining that the garment will collide with the heads 30, determining that it is no good, the liquid discharge apparatus 1 stops the pulling of the platen 22 on the spot. Alternatively, the liquid discharge apparatus 1 returns the platen 22 to the garment placement position on the front side of the liquid discharge apparatus 1.

When the platen 22 has been pulled in the −Y direction without any problem, the liquid discharge apparatus 1 waits for the image data Im. Then, the liquid discharge apparatus 1 receives the image data Im from the information processing apparatus 2. Alternatively, if the image data Im is accumulated in a controller board 15 in advance, the liquid discharge apparatus 1 starts the printing operation when the image data Im is selected on the operation panel 18.

When starting the printing operation, the liquid discharge apparatus 1 first moves the platen 22 by the slider 19 to the printing start position.

Subsequently, the liquid discharge apparatus 1 performs printing by discharging ink while moving the carriage 13 once in the main scanning direction (one scan). Thereafter, the liquid discharge apparatus 1 moves the platen 22 in the +Y direction by the slider 19 so as to be timed to coincide with the completion of printing. This movement along the sub-scanning direction corresponds to line feed processing. Accordingly, the garment is moved to the next printing position.

After the movement of the slider 19 is completed, the liquid discharge apparatus 1 performs one-scan printing by the carriage 13 again. The liquid discharge apparatus 1 repeatedly moves the carriage 13 in the main scanning direction and then moves the slider 19 in the sub-scanning direction to perform printing on a desired region in the garment.

Upon completion of the printing, the liquid discharge apparatus 1 returns the platen 22 to the printing start position in the +Y direction of the liquid discharge apparatus 1. This completes the printing operation.

The liquid discharge apparatus 1 includes a left idle discharge receiver 25. The left idle discharge receiver 25 is a place where ink in the head 30 that has been dried by being exposed to air during printing and has increased in viscosity is discarded and discharged (idle discharge). Such ink is discarded and discharged to the left idle discharge receiver 25 at an appropriate timing according to an instruction from the controller board 15.

The liquid discharge apparatus 1 also includes a maintenance mechanism 14 (maintenance unit). The maintenance mechanism 14 has a function maintenance and recovery mechanism for each head 30. The maintenance mechanism 14 includes caps for covering the surface of a nozzle in the head 30 in order to protect the ink exposed portion in the head 30 from drying when the liquid discharge apparatus 1 does not perform printing. The caps are of two types: a moisturizing cap 31 and a suction cap 32.

The moisturizing cap 31 has the function of simply covering the nozzle surface and protecting the ink from drying. The suction cap 32 is connected to a suction pump and has, in addition to the function of the moisturizing cap 31, the function of sucking thickened ink or the like from the head 30 to recover the head 30 to an appropriate state.

The ink sucked by the suction pump passes through a waste liquid tube and is discharged to a waste bottle. The maintenance mechanism 14 also includes a wiper 33 for cleaning remaining excess ink from the nozzle surface after suction to recover the nozzle state. After sucking the thickened ink from the head 30, the liquid discharge apparatus 1 wipes the nozzle surface with the wiper 33 to scrape off the excess ink and bring the meniscus in the nozzle into a normal state.

Hardware Configuration Example of Information Processing Apparatus 2

Figure 5:
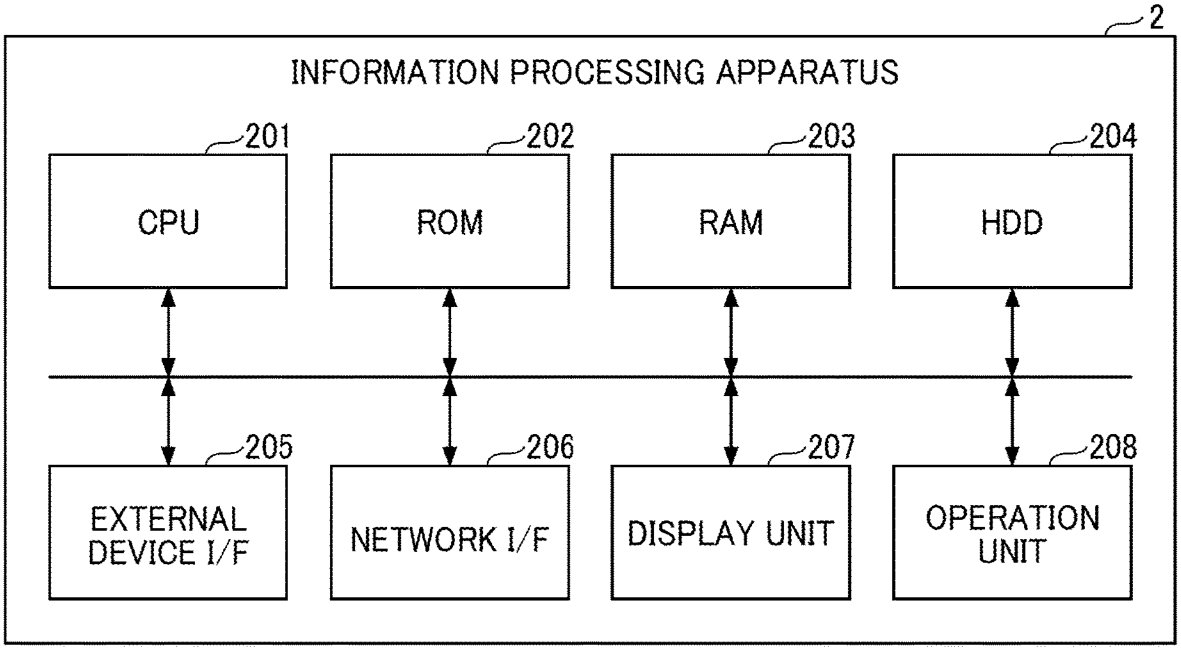
FIG. 5 is a diagram illustrating a hardware configuration example of an information processing apparatus according to the embodiment.

FIG. 5 is a block diagram illustrating an example of a hardware configuration of the information processing apparatus 2 included in the printing system 100. The information processing apparatus 2 includes a central processing unit (CPU) 201, a read only memory (ROM) 202, a random access memory (RAM) 203, and a hard disk (HDD) 204. The information processing apparatus 2 also includes an external device interface (I/F) 205, a network I/F 206, a display unit 207, and an operation unit 208. These components are electrically connected to each other via a system bus.

The CPU 201 controls the entire operation of the control unit 110 by using the RAM 203 as a work area and executing programs stored in the ROM 202.

The HDD 204 is used as a storage unit that stores preset setting values. The information stored in the HDD 204 may be read and used by the CPU 201 at execution of a program. The information processing apparatus 2 may include a solid state drive (SSD) or the like as a storage unit instead of the HDD 204.

The external device I/F 205 is an interface communicably connected to an external device such as a USB memory.

The network I/F 206 is an interface communicably connected to the network NW. The information processing apparatus 2 can be communicably connected to the liquid discharge apparatus 1 via the network I/F 206 and the network NW.

The display unit 207 displays execution screens and the like of various types of application software (Hereinafter, referred to as simply applications). The display unit 207 includes a display device such as a liquid crystal display, for example.

The operation unit 208 receives an operation input by the user of the printing system 100. The operation unit 208 includes an input device such as a mouse or a keyboard.

Configuration Example of Platen 22 According to First Embodiment

Figure 6:
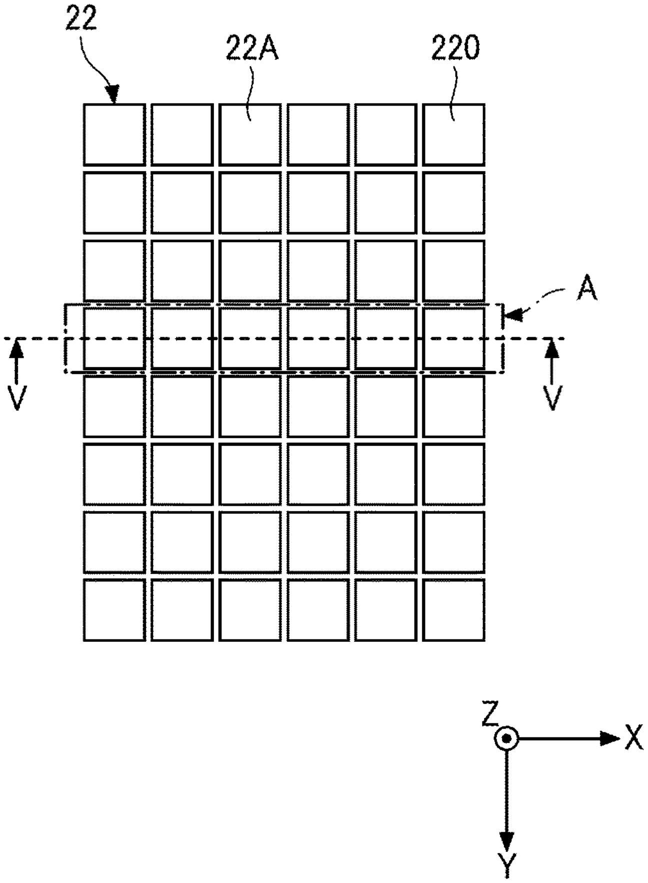
FIG. 6 is a top view of a configuration example of a platen according to a first embodiment.
Figure 7:
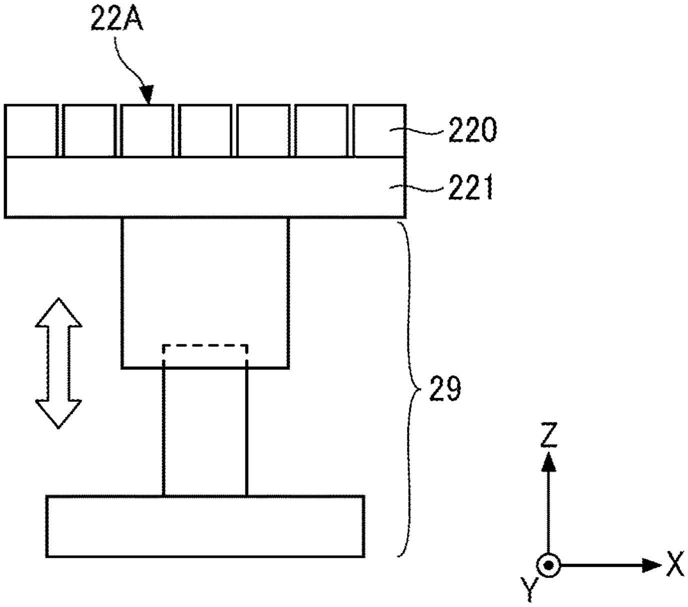
FIG. 7 is a front view of the configuration example of the platen according to the first embodiment.
Figure 8:
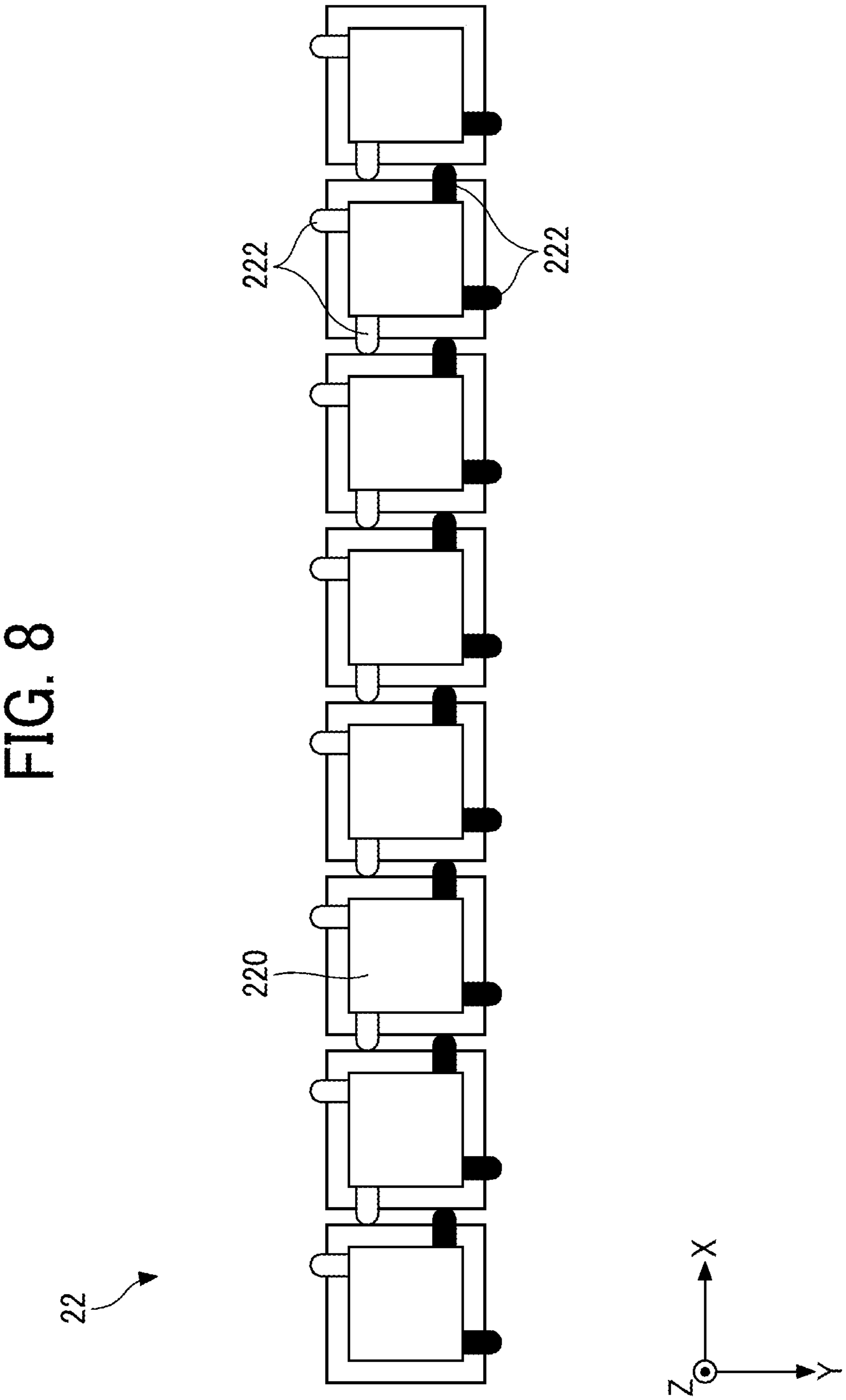
FIG. 8 is an enlarged top view of an area A in FIG. 6.
Figure 9:
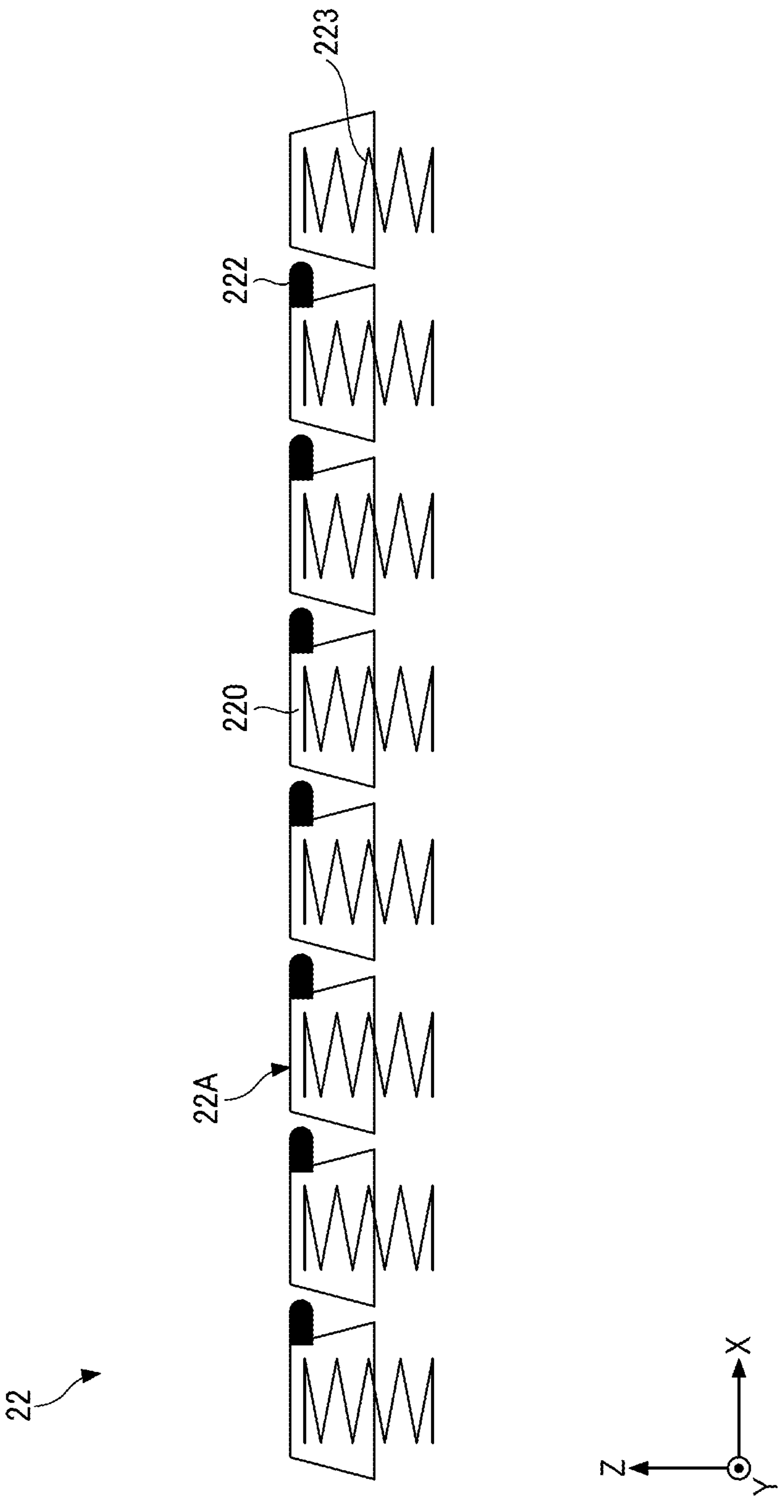
FIG. 9 is a cross-sectional view taken along line V-V in FIG. 6.
Figure 10:
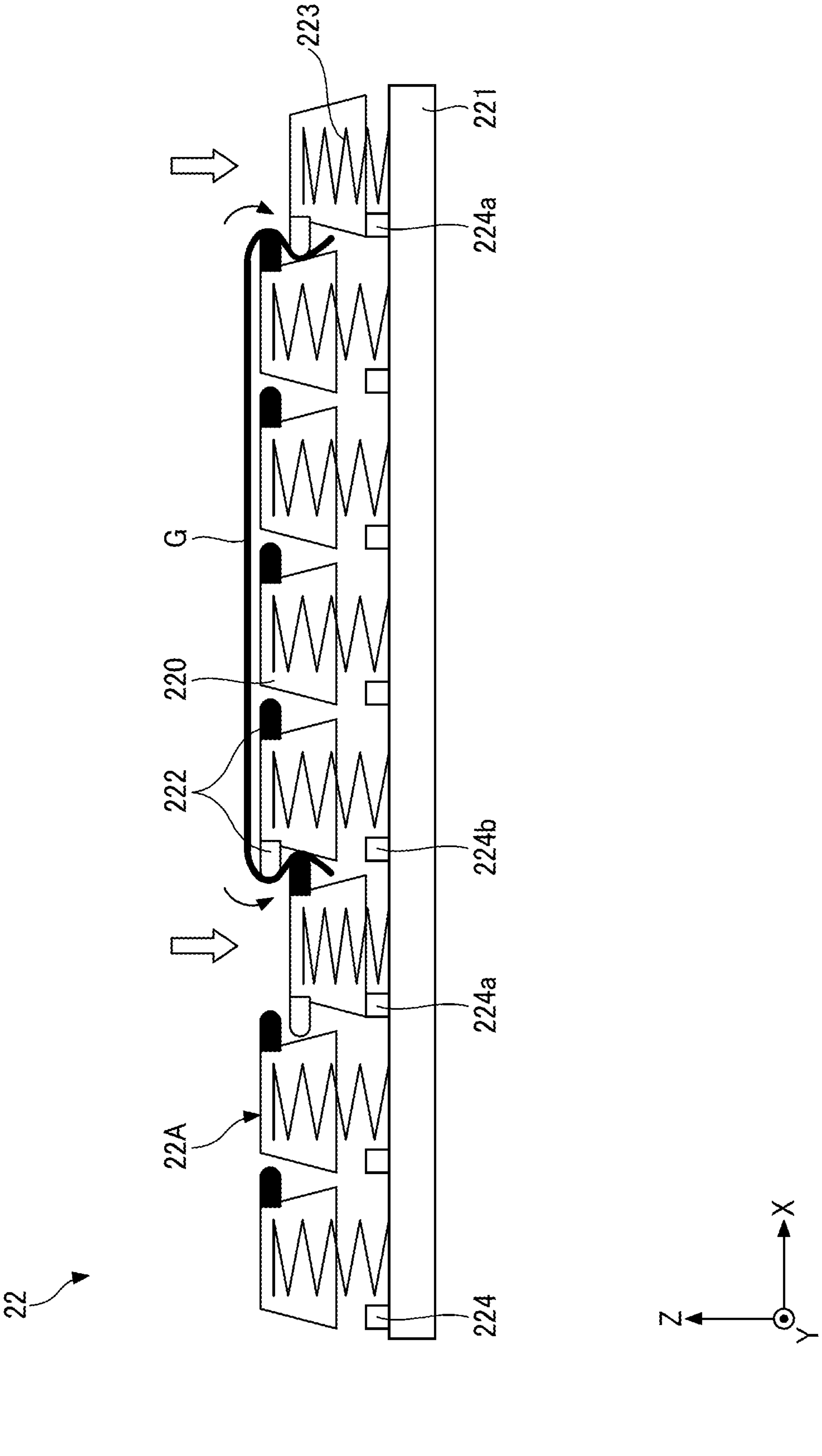
FIG. 10 is a cross-sectional view taken along line V-V in FIG. 6 with a garment placed.
Figure 12:
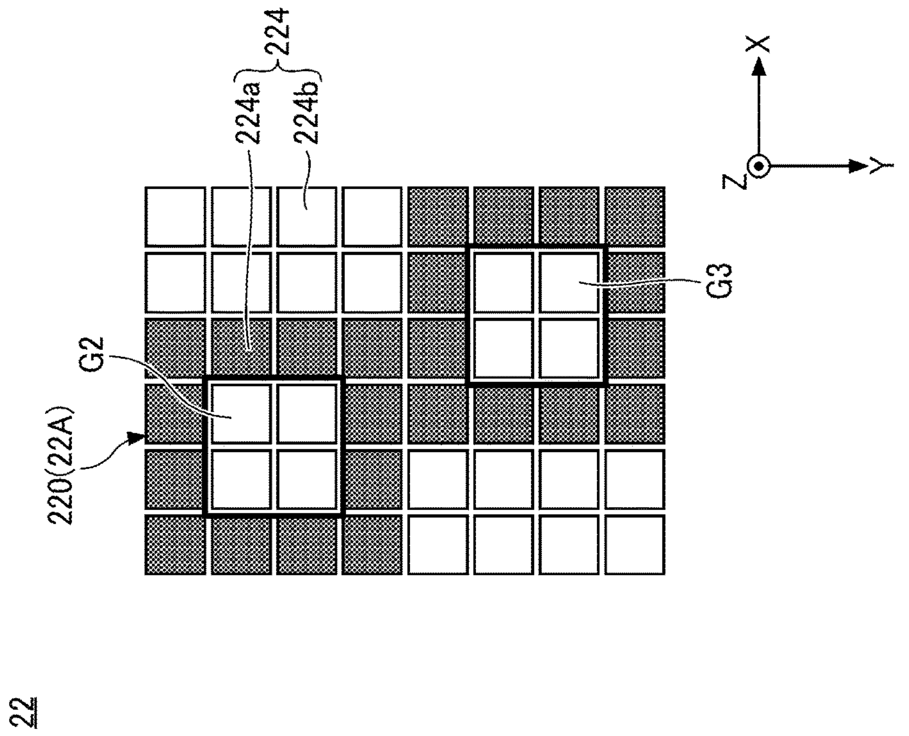
FIG. 12 is a view of a second placement example of the platen according to the first embodiment.
Figure 11:
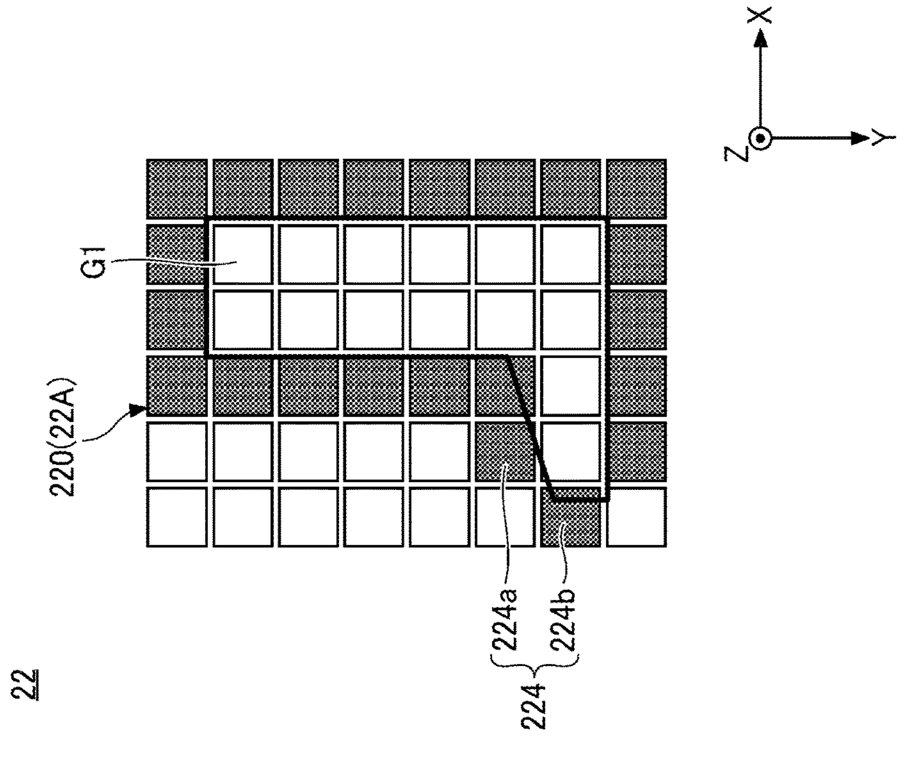
FIG. 11 is a view of a first placement example of the platen according to the first embodiment.

Next, a configuration of the platen 22 according to the first embodiment included in the liquid discharge apparatus 1 will be described with reference to FIGS. 6 to 12. FIGS. 6 and 7 are diagrams illustrating a configuration of the platen 22, in which FIG. 6 is a top view and FIG. 7 is a front view. FIG. 8 is an enlarged top view of an area A in FIG. 6. FIG. 9 is a cross-sectional view taken along line V-V in FIG. 6. FIG. 10 is a cross-sectional view taken along line V-V in FIG. 6 with a garment G placed. FIGS. 11 and 12 are diagrams illustrating examples of placement of the platen 22, in which FIG. 11 is a first example and FIG. 12 is a second example.

As illustrated in FIGS. 6 to 10, the platen 22 includes a placement surface 22A and multiple block bodies 220. The irregular shape of the placement surface 22A can be changed according to the irregularities on the garment G by changing the height of each of the multiple block bodies 220. A part of each of the multiple block bodies 220 forms a part of placement surface 22A.

In FIG. 6, the multiple block bodies 220 is indicated by small squares aligned along the X direction and the Y direction.

The irregularities on the garment G are irregularities along the Z direction, and the irregular shape of the placement surface 22A is an irregular shape along the Z direction. A part of each of the multiple block bodies 220 forms a surface on the +Z direction side of each of the multiple block bodies 220. The surfaces on the +Z direction side of the multiple block bodies 220 are aligned along the X direction and the Y direction to constitute the placement surface 22A. The garment G is placed on the placement surface 22A.

As illustrated in FIGS. 6 and 7, the platen 22 is fixed to the platen lifting mechanism 29, and can be lifted and lowered in the Z direction by the platen lifting mechanism 29. A platen base 221 is arranged such that the surface on the −Z direction side faces the platen lifting mechanism 29, and the multiple block bodies 220 is fixed on the surface on the +Z direction side of the platen base 221.

The liquid discharge apparatus 1 lifts and lowers the platen lifting mechanism 29 to adjust the distance between the surface on the +Z direction side of the garment G placed on the placement surface 22A and the nozzles of the heads 30 to a desired distance.

As illustrated in FIGS. 8 and 9, each of the multiple block bodies 220 is a box-like member having a substantially rectangular shape in a top view and a substantially trapezoidal shape in a side view, and has a push spring 223 inside.

The push spring 223 is arranged such that its elastic force acts along the Z direction, and biases the corresponding block body 220 in the +Z direction. Each block body 220 is displaceable along the Z direction. The block body 220 is displaced in the −Z direction under a pressing force acting in the −Z direction. When the pressing force is removed, the block body 220 is displaced in the +Z direction under the elastic force of the push spring 223 and returns to the original position. For example, the multiple block bodies 220 is configured as push switches capable of switching between a first position and a second position that is a position on the −Z direction side with respect to the first position. The user can alternately switch between the first position and the second position by pushing the block bodies 220 in the −Z direction.

As illustrated in FIG. 10, when placing the garment G on the placement surface 22A, the user pushes and displaces the block bodies 220 located at the ends of the garment G placed on the placement surface 22A in the −Z direction. Each of the multiple block bodies 220 includes a pressing member 222 that presses the garment G placed on the placement surface 22A.

The platen 22 secures the garment G to the placement surface 22A by sandwiching the ends of the garment G between the pressing members 222 of the adjacent block bodies 220. The platen 22 can apply tension to the garment G by securing the garment G, and can fix the garment G such that the surface of the garment G is not bent and the surface is substantially orthogonal to the discharge direction of the ink from the heads 30.

A sensor 224 is provided between each of the multiple block bodies 220 and the platen base 221. The sensor 224 is a push switch-type sensor that detects a pressing force when the block body 220 is pressed against a part of the block body 220 due to displacement of the block body, for example. For example, the block bodies 220 may include a conductive material such as metal, and the sensors 224 may detect energization by contact with the block body 220.

Each sensor 224 outputs a detection signal indicating whether the block body 220 is located at the second position, to the controller board 15. For example, the sensor 224 outputs an ON signal when the block body 220 is located at the second position, and outputs an OFF signal when the block body 220 is not located at the second position. In FIG. 10, a sensor 224_a_ represents a sensor that outputs an ON signal, and a sensor 224_b_ represents a sensor that outputs an OFF signal. The information processing apparatus 2 can also input detection signals by the sensors 224 via the controller board 15.

As illustrated in FIGS. 11 and 12, the platen 22 can also secure multiple portions at the end portions of the garment G placed on the placement surface 22A by the pressing members 222. The end portions of the garment G in this case correspond to the contour of the garment G placed on the placement surface 22A when being viewed from above.

In the example of FIG. 11, a garment G1 is a sock, the sensors 224 positioned at the contour of the sock viewed from above are on (sensors 224*a*), and the garment G1 is fixed by the pressing members 222 at the positions where the sensors 224 are on.

In the example of FIG. 12, each of garments G2 and G3 is a handkerchief having a substantially rectangular shape in a top view. The sensors 224 positioned at the contours of the two handkerchiefs as viewed from above are on (sensors 224*a*), and the garments G2 and G3 are fixed by the pressing members 222 at the positions where the sensors 224 are on.

First Embodiment

Functional Configuration Example of Information Processing Apparatus 2

Figure 13:
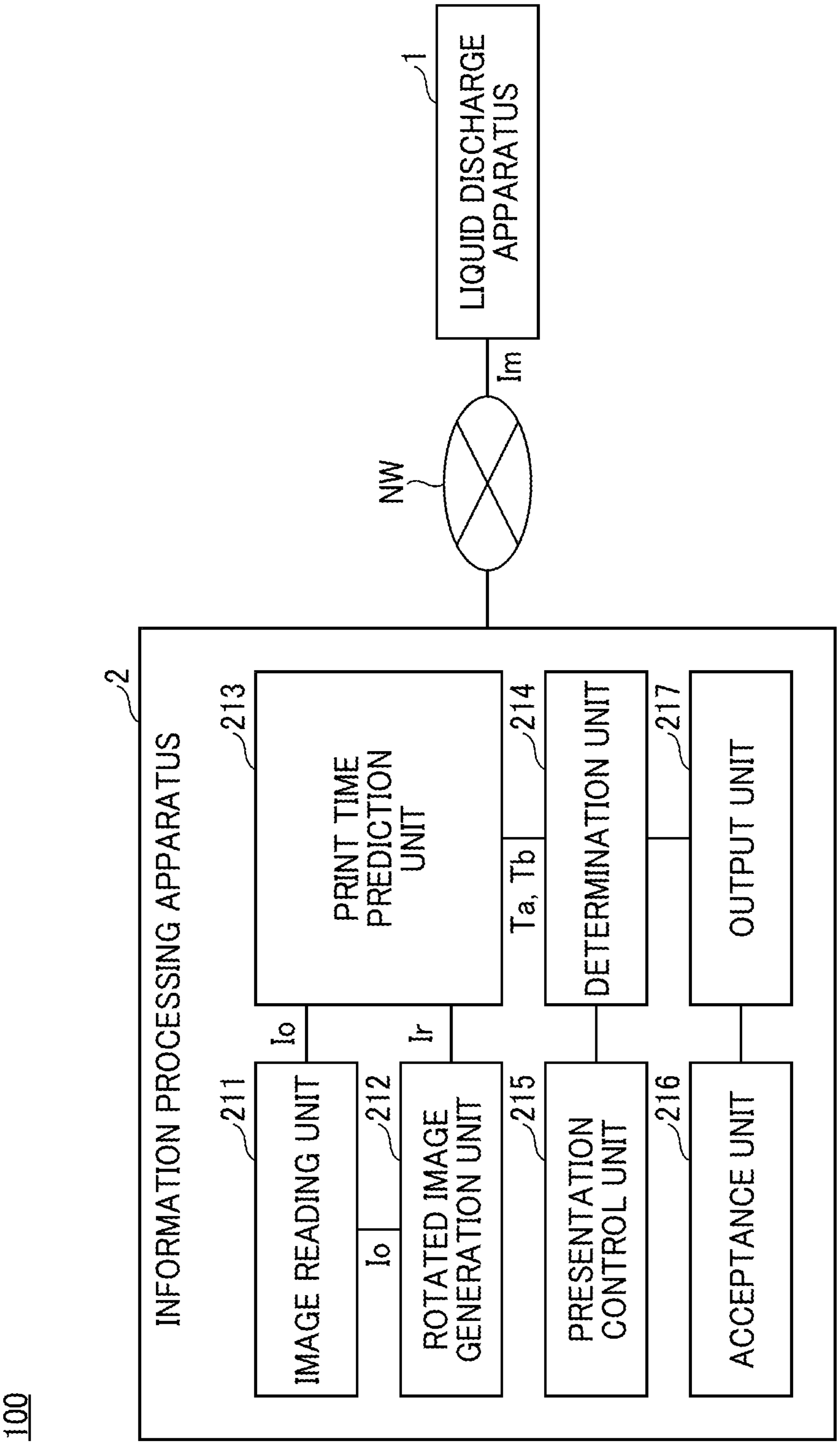
FIG. 13 is a diagram of an exemplary functional configuration of an information processing apparatus according to the first embodiment.

FIG. 13 is a block diagram illustrating an example of a functional configuration of the information processing apparatus 2 according to the first embodiment. The information processing apparatus 2 includes an image reading unit 211, a rotated image generation unit 212, a print time prediction unit 213, a determination unit 214, a presentation unit 215, an acceptance unit 216, and an output unit 217.

The information processing apparatus 2 implements the functions of the image reading unit 211, the rotated image generation unit 212, the print time prediction unit 213, the determination unit 214, and the presentation unit 215 by the CPU 201 executing predetermined programs. Alternatively, the information processing apparatus 2 can also implement at least a part of the functions of the above-described components by an electric circuit or an electronic circuit. In the information processing apparatus 2, the function of the acceptance unit 216 is implemented by the operation unit 208, and the function of the output unit 217 is implemented by the external device I/F 205 or the network I/F 206.

The image reading unit 211 has a function of reading original image data Io that is a source of the image data Im. The image reading unit 211 can read the original image data Io stored in the HDD 204 from the HDD 204, for example. Alternatively, the image reading unit 211 may read the original image data Io from an external device connected via the external device I/F 205 or an external device connected via the network I/F 206 and the network NW.

The rotated image generation unit 212 generates rotated image data Ir by rotating the original image data Io input via the image reading unit 211 by a predetermined angle. The predetermined angle is −90 degrees, for example, but is not limited thereto, and may be any angle.

The print time prediction unit 213 predicts a first print time Ta of the image to be printed on the garment G by the liquid discharge apparatus 1, through calculation based on the original image data Io input from the image reading unit 211. The print time prediction unit 213 also predicts a second print time Tb of the image to be printed on the garment G by the liquid discharge apparatus 1, through calculation based on the rotated image data Ir input from the rotated image generation unit 212.

The liquid discharge apparatus 1 performs printing by repeating the relative movement of the head 30 in the main scanning direction. Thus, the print time prediction unit 213 can predict the first print time Ta and the second print time Tb by integrating the number of relative movements of the head 30 in the main scanning direction acquired based on the original image data Io or the rotated image data Ir and the time needed to move the head 30 in the main scanning direction.

The determination unit 214 determines the position and direction of the garment G based on the information on the times for printing the garment G by the liquid discharge apparatus 1. For example, the determination unit 214 compares the first print time Ta and the 5 second print time Tb predicted by the print time prediction unit 213. If the second print time Tb is shorter than the first print time Ta, the determination unit 214 determines a predetermined angle that is a rotation angle of the rotated image data Ir as the direction of the garment G.

Here, in the liquid discharge apparatus 1, the smaller the number of relative movements of the head 30 in the main scanning direction, the shorter the time for printing the garment G. Furthermore, when the longitudinal direction of the image included in the original image data Io, which is the direction in which the image is longest, becomes substantially parallel to the main scanning direction, the number of relative movements of the head 30 in the main scanning direction becomes the smallest. Therefore, the determination unit 214 may determine the direction of the garment G such that the longitudinal direction of the image included in the original image data Io is along the main scanning direction.

In the liquid discharge apparatus 1, the shorter the relative moving distance of the head 30 in the sub-scanning direction, the shorter the time for printing the garment G. As the position of the image to be printed on the garment G is closer to the print start position of the head 30 on the platen 22, the relative movement distance of the head 30 in the sub-scanning direction becomes shorter. Therefore, the determination unit 214 determines the position of the garment G so that the position of the image to be printed on the garment G is close to the print start position of the head 30 on the platen 22.

The determination unit 214 generates the image data Im by changing the position and direction of the image included in the original image data Io according to the determined position and direction of the garment G. Specifically, the determination unit 214 generates the image data Im by changing the position of the image included in either the original image data Io or the rotated image data Ir according to the determined direction, depending on the determined position of the garment G. Alternatively, the determination unit 214 generates the image data Im by changing the position and direction of the image included in the original image data Io according to the determined position and direction of the garment G.

The presentation unit 215 presents the position and direction of the garment G determined by the determination unit 214. For example, the presentation unit 215 can present the position and direction of the garment G by displaying a screen indicating the position and direction of the garment G on the display unit 207, so that the user of the printing system 100 can visually recognize the position and direction. The user can place the garment G on the placement surface 22A of the platen 22 according to the presented position and direction of the garment G.

The presentation unit 215 may also be a display that displays the position and direction of the garment G determined by the determination unit 214.

After the garment G is placed on the placement surface 22A, the acceptance unit 216 receives a print instruction issued by the user via the operation unit 208.

The output unit 217 outputs the image data Im generated by the determination unit 214 and outputs a print instruction to the liquid discharge apparatus 1. The image data Im output by the output unit 217 is supplied to the liquid discharge apparatus 1 via the network NW or the portable storage medium.

Example of Image Data Im According to First Embodiment

Figure 14:
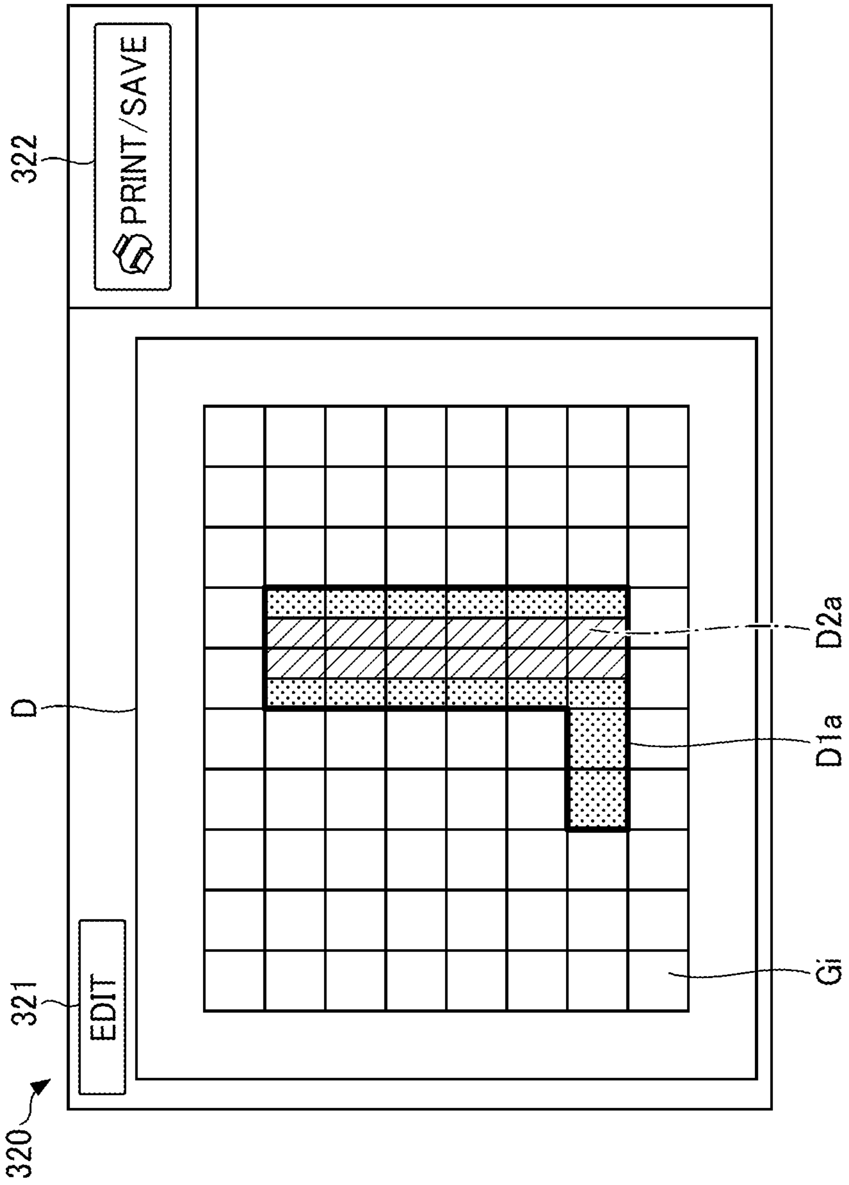
FIG. 14 is a diagram illustrating a first example of image data according to the first embodiment.
Figure 15:
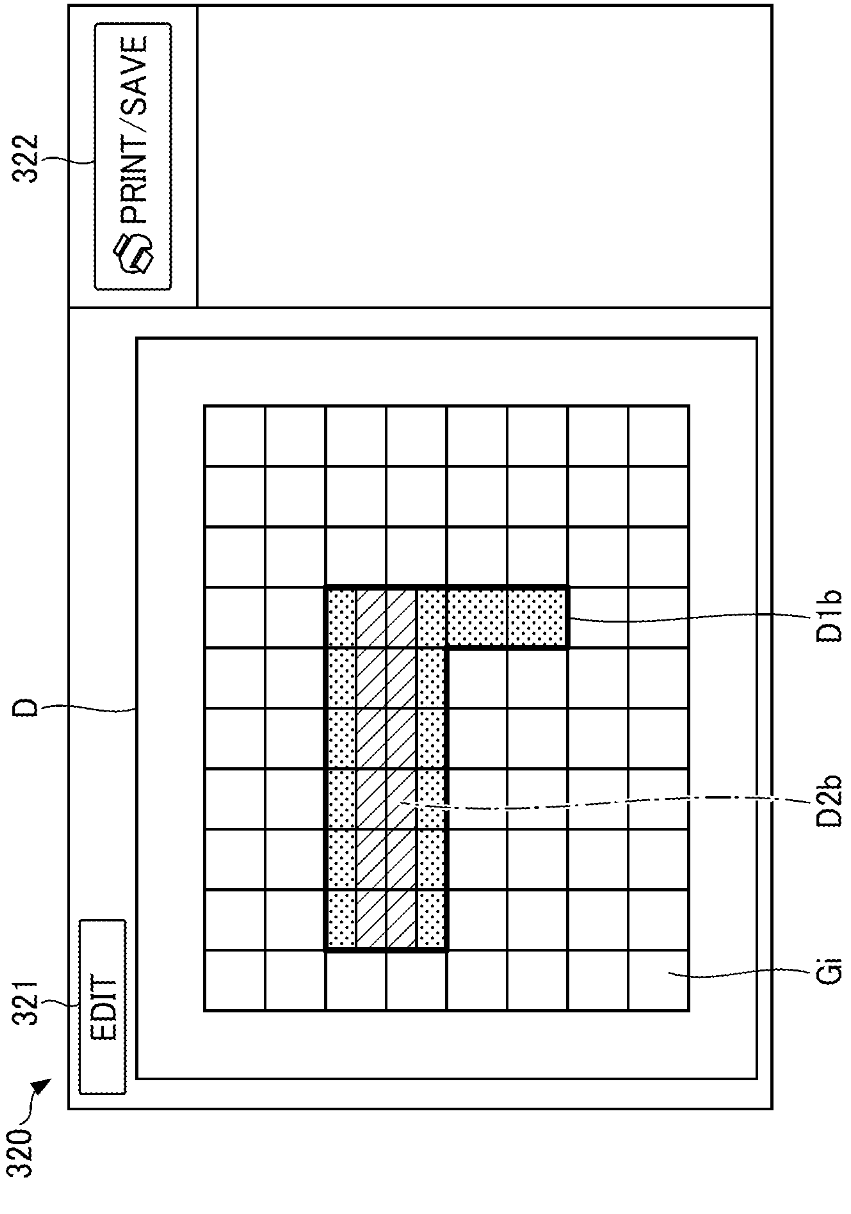
FIG. 15 is a diagram illustrating a second example of image data according to the first embodiment.
Figure 16:
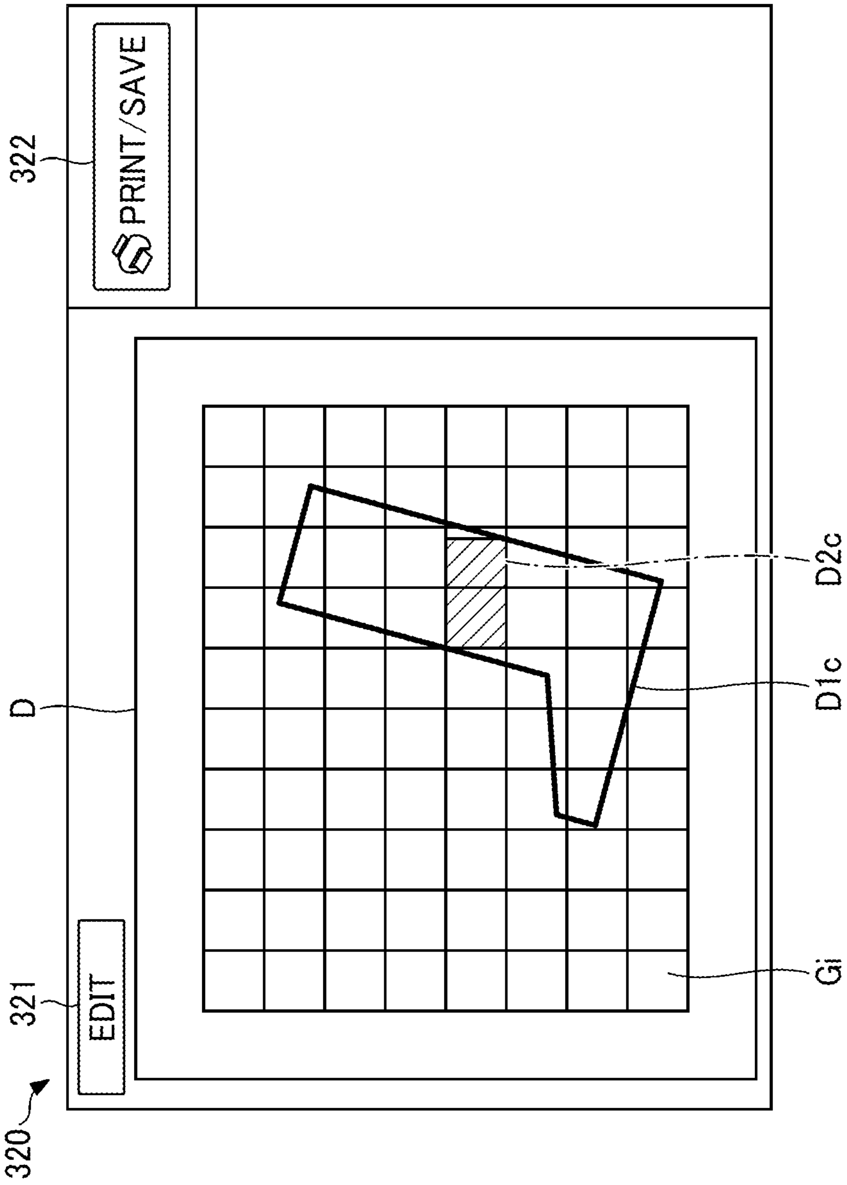
FIG. 16 is a diagram illustrating a third example of image data according to the first embodiment.

FIGS. 14 to 16 are diagrams illustrating image data Im according to the first embodiment, in which FIG. 14 illustrates a first example, FIG. 15 illustrates a second example, and FIG. 16 illustrates a third example.

In the information processing apparatus 2, an editing application for editing the original image data Io is installed. FIGS. 14 to 16 illustrate an edit screen 320 of the original image data Io displayed on the display unit 207 of the information processing apparatus 2 when the editing application is executed.

In FIGS. 14 to 16, the edit screen 320 displays a display image D, an edit button 321, and a print button 322. The display image D is displayed in the center of the screen, and the edit button 321 and the print button 322 are displayed around the display image D. However, the display positions of the display image D, the edit button 321, and the print button 322 are arbitrary. The edit screen 320 may display user interface (UI) components other than the display image D, the edit button 321, and the print button 322.

The display image D represents an image to be printed on the garment G based on the image data Im. The edit button 321 is a button operated to start editing of the original image data Io. The print button 322 is a button operated to start printing. Block images Gi in the display image D represent the block bodies 220 of the platen 22.

In FIG. 14, a sock image D1*a* represents a sock as the garment G, and a print image D2*a* represents an image to be printed on the sock. The print image D2*a* corresponds to the original image data Io.

In FIG. 15, a sock image D1*b* represents a sock as the garment G, and a print image D2*b* represents an image to be printed on the sock. The sock image D1*b* is rotated by −90 degrees with respect to the sock image D1*a*. The print image D2*b* corresponds to the rotated image data Ir obtained by rotating the original image data Io by −90 degrees according to the rotation of the sock image D1*b*.

In FIG. 16, a sock image D1*c* represents a sock as the garment G, and a print image D2*c* represents an image to be printed on the sock. The sock image D1*c* is rotated by +20 degrees with respect to the sock image D1*a*. The print image D2*c* corresponds to the rotated image data Ir obtained by rotating the original image data Io by +20 degrees according to the rotation of the sock image D1*c*.

Relative Movement Example of Head 30 According to First Embodiment

Figure 17:
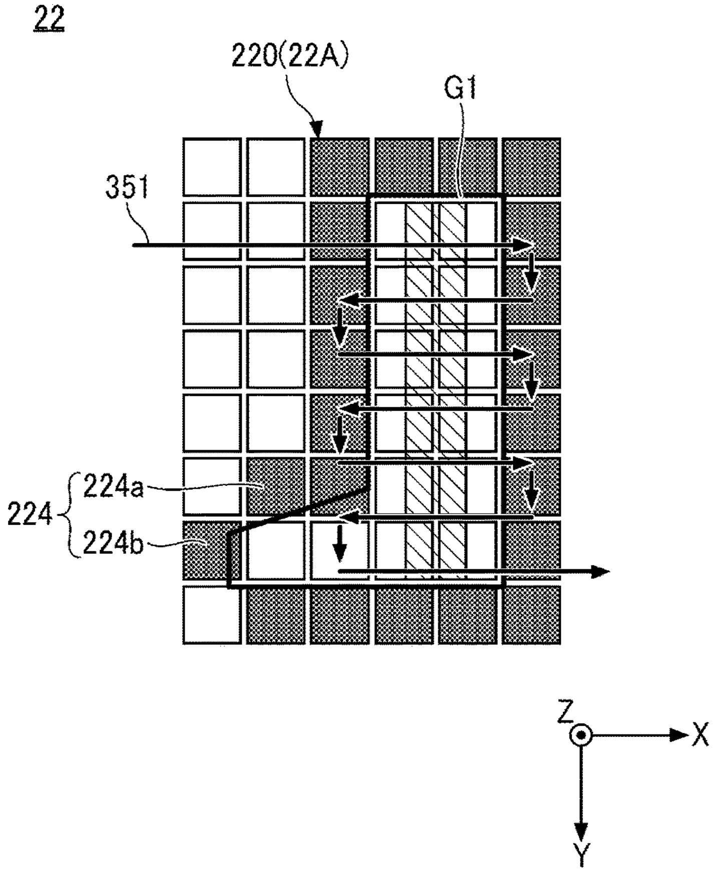
FIG. 17 is a diagram illustrating a first example of relative movement of a head according to the first embodiment.
Figure 18:
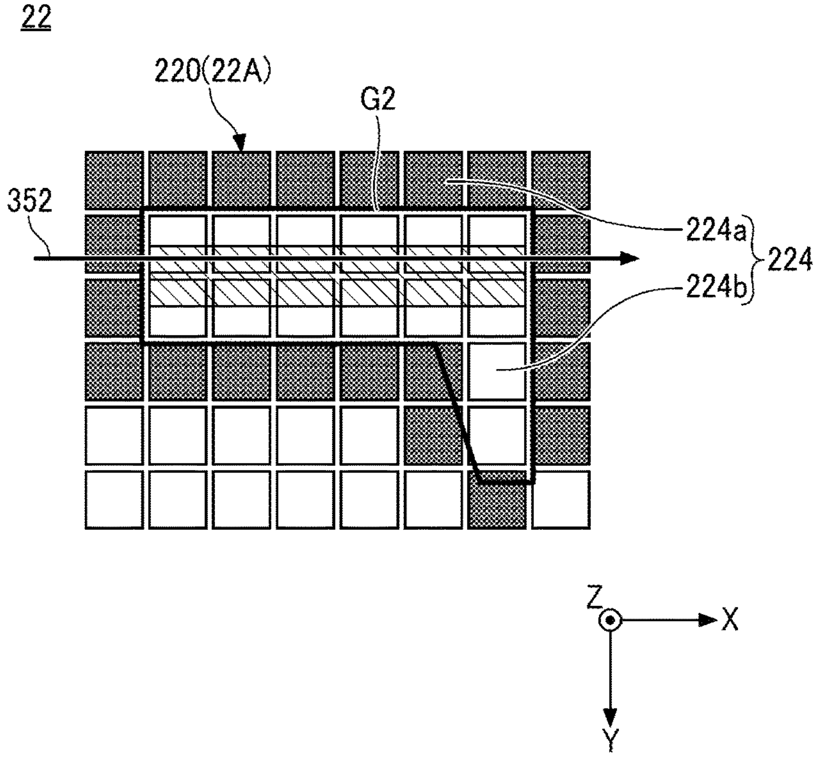
FIG. 18 is a diagram illustrating a second example of the relative movement of the head according to the first embodiment.
Figure 19:
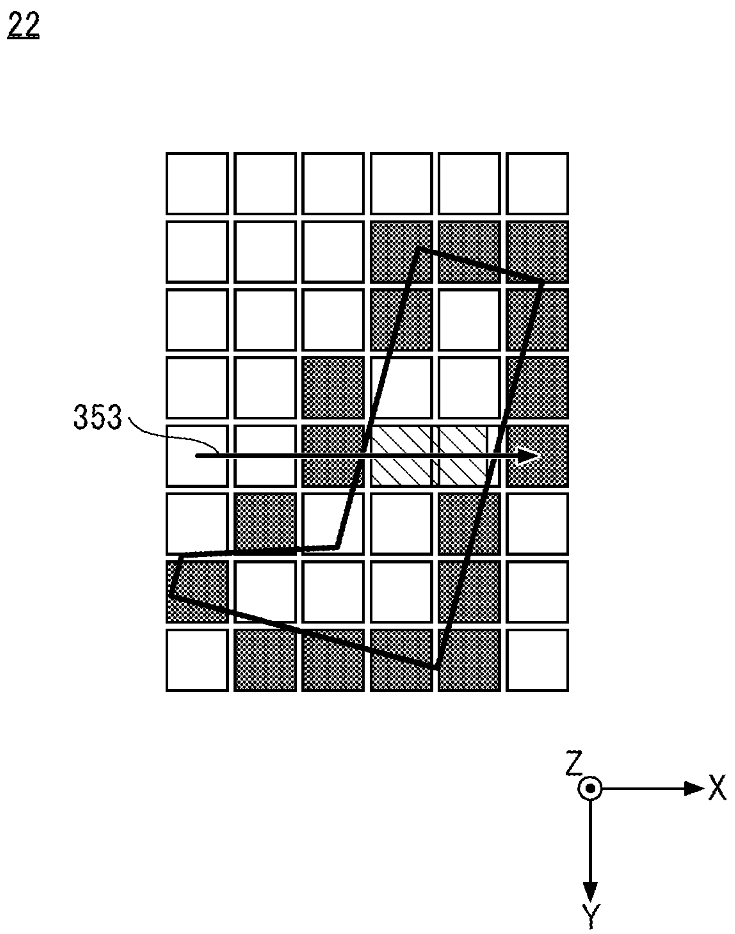
FIG. 19 is a diagram illustrating a third example of the relative movement of the head according to the first embodiment.

FIGS. 17 to 19 are diagrams illustrating the relative movement of the head 30 according to the first embodiment with respect to the garment G along the main scanning direction, in which FIG. 17 illustrates a first example, FIG. 18 illustrates a second example, and FIG. 19 illustrates a third example. As the carriage 13 moves along the main scanning direction, the head 30 moves relative to the garment G along the main scanning direction.

Paths 351, 352, and 353 indicated by thick-line arrows in FIGS. 17, 18, and 19, respectively, represent paths of relative movement of the head 30 along the main scanning direction.

FIG. 17 illustrates an example of the relative movement of the head 30 when a sock as the garment G is placed on the platen 22 in a state where the sock is not rotated, here, in a state where the longitudinal direction of the image to be printed on the garment G is substantially orthogonal to the main scanning direction. As indicated by the path 351, when the sock is not rotated, the number of relative movements in the main scanning direction is 7.

FIG. 18 illustrates an example of the relative movement of the head 30 when a sock as the garment G is placed on the platen 22 in a state where the sock is rotated by −90 degrees, here, in a state where the longitudinal direction of the image to be printed on the garment G is substantially parallel to the main scanning direction. As indicated by the path 352, with the sock rotated by −90 degrees, the number of relative movements in the main scanning direction is 1.

As illustrated in FIGS. 17 and 18, when the garment G is placed on the platen 22 such that the longitudinal direction of the image to be printed on the garment G is substantially parallel to the main scanning direction, the number of relative movements of the head 30 becomes smallest. As the number of relative movements of the head 30 decreases, the print time is shortened. When the number of relative movements is smallest, the print time becomes shortest.

As illustrated in FIG. 19, in the case of printing an image of which the longitudinal direction is inclined with respect to the sock as the garment G, the garment G is obliquely placed on the platen 22 such that the longitudinal direction of the image is substantially parallel to the main scanning direction, whereby the print time becomes the shortest.

Example of Process by Information Processing Apparatus 2

Figure 20:
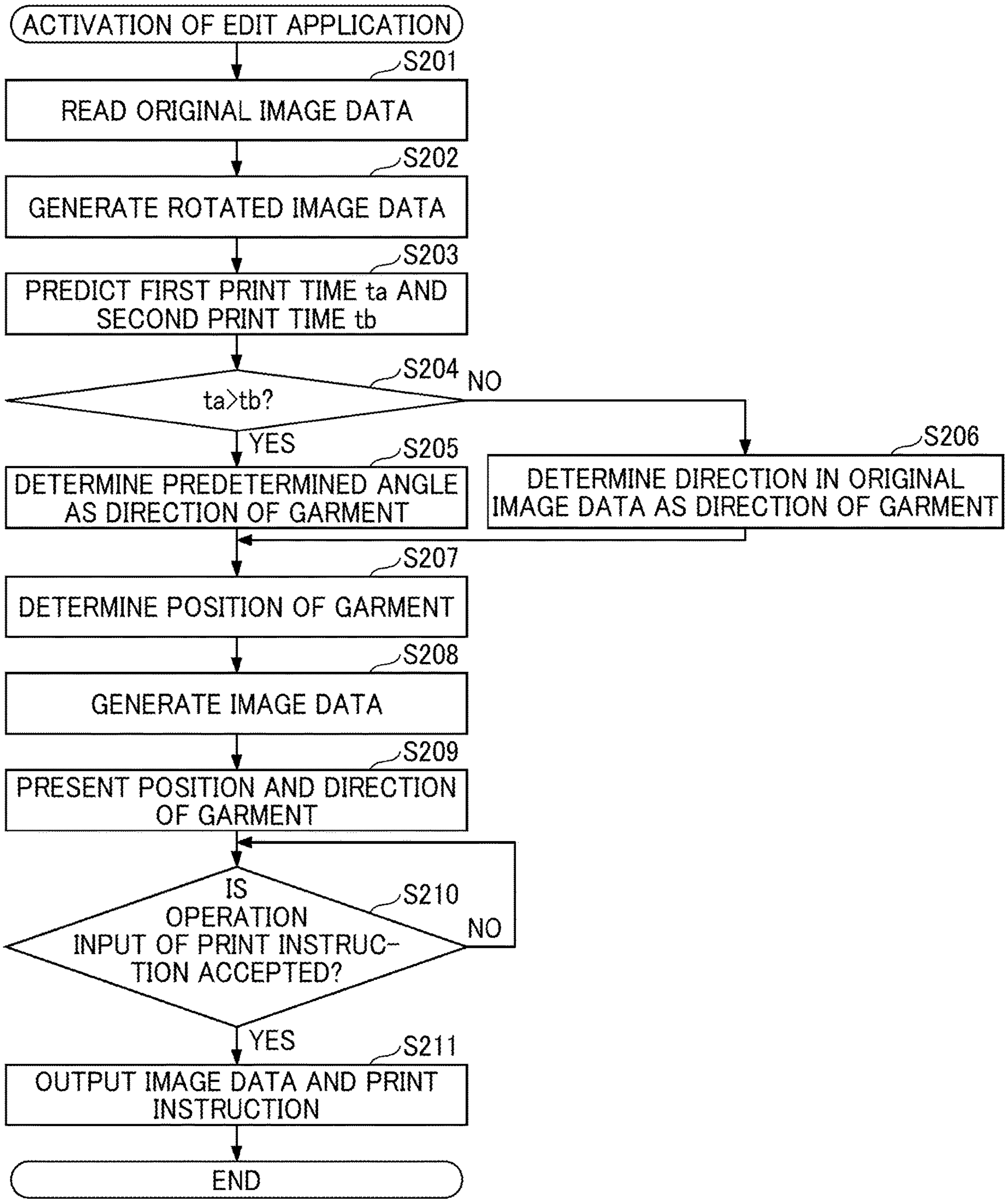
FIG. 20 is a diagram illustrating a first example of processing by the information processing apparatus according to the first embodiment.

FIG. 20 is a flowchart illustrating a first example of a process by the information processing apparatus 2. The information processing apparatus 2 starts the process illustrated in FIG. 20, in response to an operation for starting the editing application input by the user via the operation unit 208.

First, in step S201, the information processing apparatus 2 causes the image reading unit 211 to read the original image data Io that is a source of the image data Im.

Subsequently, in step S202, the information processing apparatus 2 causes the rotated image generation unit 212 to generate rotated image data Ir obtained by rotating the original image data Io input via the image reading unit 211 by a predetermined angle.

Subsequently, in step S203, the information processing apparatus 2 causes the print time prediction unit 213 to predict the first print time Ta of the image to be printed on the garment G by the liquid discharge apparatus 1, based on the original image data Io input via the image reading unit 211. The information processing apparatus 2 also causes the print time prediction unit 213 to predict the second print time Tb of the image to be printed on the garment G by the liquid discharge apparatus 1, based on the rotated image data Ir input from the rotated image generation unit 212.

Subsequently, in step S204, the information processing apparatus 2 causes the determination unit 214 to compare the first print time Ta and the second print time Tb predicted by the print time prediction unit 213, and determines whether the first print time Ta is longer than the second print time Tb.

When determining in step S204 that the first print time Ta is longer than the second print time Tb (Yes in step S204), in step S205, the information processing apparatus 2 causes the determination unit 214 to determine a predetermined angle (the direction of the rotated image data Ir) as the direction of the garment G. On the other hand, if determining that the first print time Ta is equal to or smaller than the second print time Tb (No in step S204), in step S206, the information processing apparatus 2 causes the determination unit 214 to determine the direction of the original image data Io as the direction of the garment G.

Subsequently, in step S207, the information processing apparatus 2 causes the determination unit 214 to determine the position of the garment G such that the position of the image to be printed on the garment G is close to the print start position of the head 30 on the platen 22.

Subsequently, in step S208, the information processing apparatus 2 causes the determination unit 214 to generate the image data Im by changing the position and direction of the image in the original image data Io according to the determined position and direction of the garment G.

Subsequently, in step S209, the information processing apparatus 2 causes the presentation unit 215 to present the position and direction of the garment G determined by the determination unit 214.

Subsequently, in step S210, the information processing apparatus 2 determines whether a print instruction from the user has been accepted by the acceptance unit 216.

When determining in step S210 that the request has not been accepted (No in step S210), the information processing apparatus 2 performs step S210 again. On the other hand, when it is determined in step S210 that the request has been accepted (Yes in step S210), the output unit 217 outputs the image data Im generated by the determination unit 214 and outputs a print instruction to the liquid discharge apparatus 1. The image data Im output by the output unit 217 is supplied to the liquid discharge apparatus 1 via the network NW or the portable storage medium.

As described above, the information processing apparatus 2 can supply the image data Im to the liquid discharge apparatus 1 while presenting the position and direction of the garment G.

In the present embodiment, the determination unit 214 compares two of the first print time Ta based on the original image data Io and the second print time Tb based on the rotated image data Ir, as an example. However, the present disclosure is not limited to this example. The rotated image generation unit 212 may generate two or more pieces of rotated image data Ir having different rotation angles from each other, and the determination unit 214 may compare the original image data Io and each of the two or more pieces of rotated image data Ir, and determine the angle at which the print time is shortest as the direction of the garment G.

Figure 21:
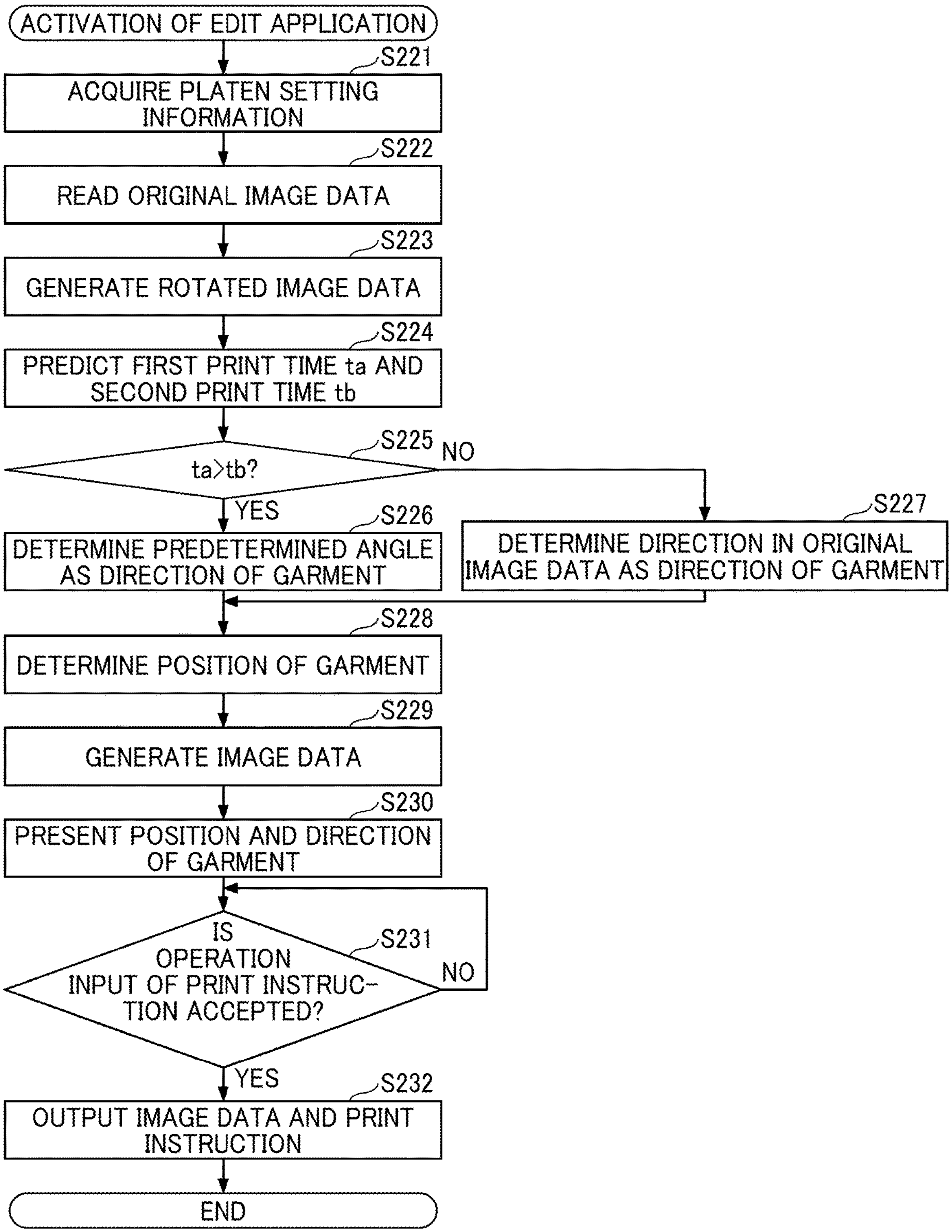
FIG. 21 is a diagram illustrating a second example of processing by the information processing apparatus according to the first embodiment.

FIG. 21 is a flowchart illustrating a second example of a process by the information processing apparatus 2. The process of FIG. 21 is different from the processing of FIG. 20 only in step S221, and step S222 to step S232 are the same as step S201 to step S211 illustrated in FIG. 20. Therefore, redundant description is omitted here, and only differences will be described.

In step S221 of FIG. 21, the information processing apparatus 2 causes the determination unit 214 to acquire the setting information of the platen 22. There are multiple types of platens 22. Information in which the type of the platen 22 is associated with information on the setting condition and the printing condition of the platen 22 is stored in the HDD 204 or the like. Based on the information indicating the type of the platen 22 accepted by the user via the acceptance unit 216, the determination unit 214 refers to the HDD 204 to acquire the information on the setting condition and the printing condition of the platen 22.

The information processing apparatus 2 executes step S222 and the subsequent steps on the basis of the information on the setting condition and the printing condition of the platen 22. Furthermore, in step S230, the information processing apparatus 2 can present the position and direction of the garment G together with the acquired setting condition of the platen 22.

Operation and Advantageous Effects of Printing System 100

As described above, the printing system 100 includes the liquid discharge apparatus 1 that discharges ink (liquid) based on the image data Im to print an image on the garment G (print medium), and the information processing apparatus 2 that supplies the image data Im to the liquid discharge apparatus 1. The information processing apparatus 2 includes an output unit 217 that outputs the image data Im, and the liquid discharge apparatus 1 includes the platen 22 (placement member) including the placement surface 22A on which the garment G is to be placed. The printing system 100 includes the presentation unit 215 that presents the position and direction of the garment G having the shortest print time determined on the basis of the original image data Io that is the source of the image data Im, among the positions and directions of the garment G to be placed on the platen 22.

Since the presentation unit 215 presents the position and direction of the garment G having the shortest print time, the user can place the garment G on the placement surface 22A of the platen 22 in the position and direction of the garment G having the shortest print time. The printing system 100 can print an image the garment G placed in this manner based on the image data Im, thereby printing the image on the garment G in the shortest print time. In addition, since the garment G can be placed at an arbitrary position in an arbitrary direction, the position and direction of the garment G to be placed on the platen 22 can be selected with a high degree of freedom. Therefore, it is easy to place the garment G so as to shorten the print time. As above, in the present embodiment, it is possible to provide the printing system 100 capable of shortening the print time.

In the present embodiment, there is provided the determination unit 214 that compares the first print time Ta for the liquid discharge apparatus 1 to perform printing based on the original image data Io with the second print time Tb for the liquid discharge apparatus 1 to perform printing based on the rotated image data Ir obtained by rotating the original image data Io by a predetermined angle, and determines a predetermined angle as the direction of the garment G to be placed on the platen 22 when the second print time Tb is shorter than the first print time Ta. The presentation unit 215 presents the position and direction of the garment G determined by the determination unit 214. According to this configuration, the printing system 100 can determine the position and direction of the garment G to be placed on the platen 22, and cause the presentation unit 215 to present the position and direction.

The determination unit 214 may determine the direction of the garment G to be placed on the platen 22 such that the longitudinal direction of the image included in the original image data Io, which is the direction in which the length of the image is longest, is along the main scanning direction. When the garment G is placed on the platen 22 in the direction thus determined, the printing system 100 can also print an image on the garment G in the shortest print time.

In the present embodiment, the platen 22 includes multiple block bodies 220. By changing the height of each of the multiple block bodies 220, the irregular shape of the placement surface 22A can be changed according to the irregularities on the garment G. A part of each of the multiple block bodies 220 forms a part of placement surface 22A.

For example, if the surface of the garment G has irregularities, the distance between the head 30 and the surface of the garment G may deviate from a desired distance depending on the irregularities. When the distance between the head 30 and the surface of the garment G deviates from the desired distance, the position of the ink attached to the garment G may deviate from the desired position, thereby resulting in deterioration of the quality of the image formed on the garment G.

The printing system 100 can correct the irregularities on the garment G to a substantially flat state by changing the height of each of the multiple block bodies 220. As a result, the printing system 100 can prevent the distance between the head 30 and the surface of the garment G from deviating from a desired distance, and can suppress deterioration in the quality of the image formed on the garment G.

The liquid discharge apparatus 1 may have some of the functions of the functional components included in the information processing apparatus 2 according to the present embodiment. If the liquid discharge apparatus 1 has all of the functions of the functional components of the information processing apparatus 2, the liquid discharge apparatus 1 can print an image on the garment G in the shortest print time. In other words, it is possible to provide the liquid discharge apparatus 1 capable of shortening the print time.

Second Embodiment

A printing system 100*a* according to a second embodiment will be described. Components identical or similar to those in the first embodiment are denoted by the same reference numerals, and redundant description will be omitted as appropriate.

In the present embodiment, each of multiple block bodies 220*a* in a platen 22*a* in the printing system 100*a* includes a light emitting unit. A presentation unit 215*a* controls light emission by the light emitting unit to present the position and direction of a garment G placed 5 on the platen 22*a*.

Figure 22:
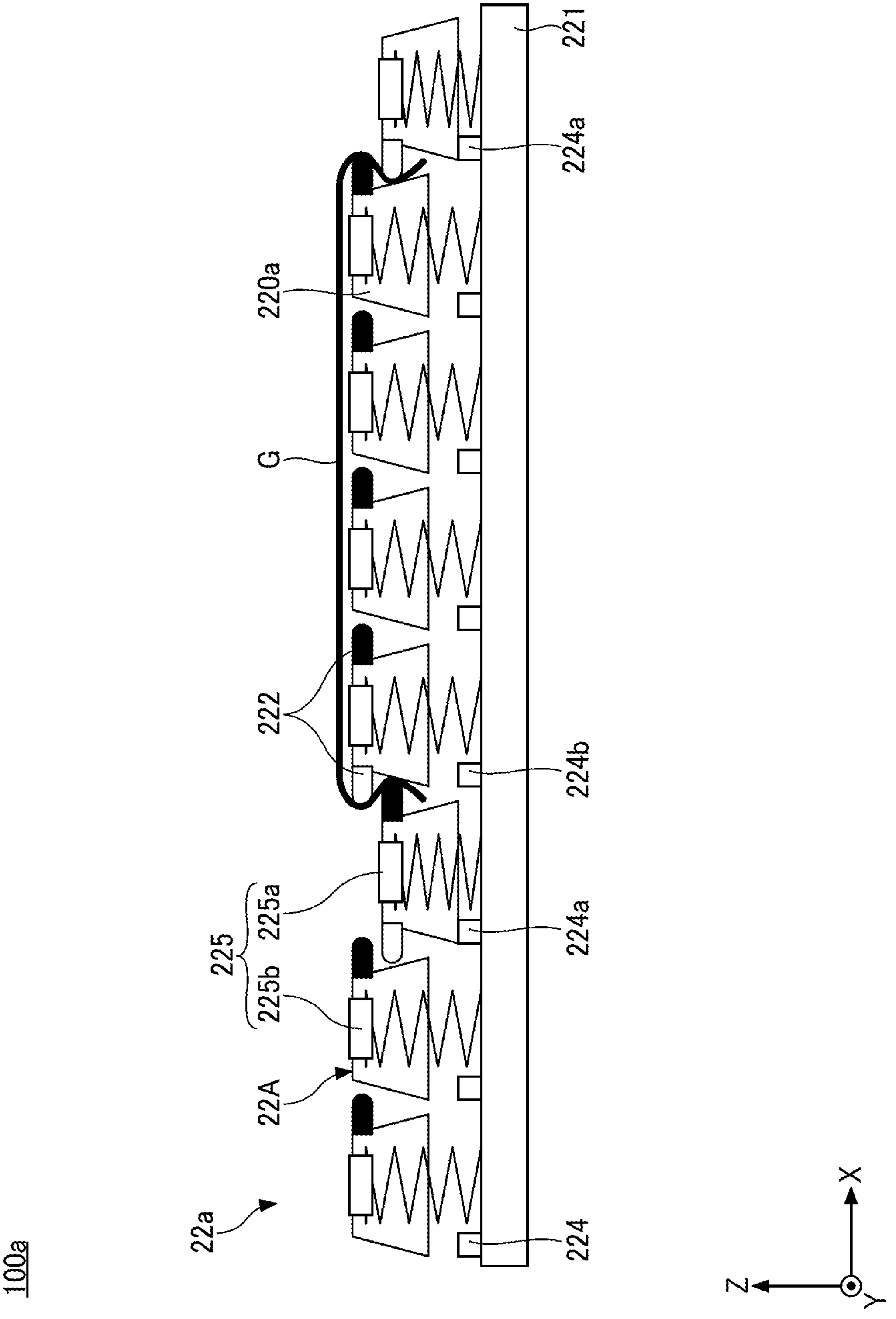
FIG. 22 is a cross-sectional view of a configuration example of a platen according to a second embodiment.

FIG. 22 is a cross-sectional view of a configuration example of the platen 22*a* according to the second embodiment. The platen 22*a* has the multiple block bodies 220*a*. Each of the multiple block bodies 220*a* includes a light emitting unit 225. The light emitting unit 225 is a light emitting diode (LED), for example. The light emitting unit 225 can switch between a light emission (ON) state and a non-light emission (OFF) state according to a control signal. In FIG. 22, a light emitting unit 225*a* represents a light emitting unit in the light emitting state, and a light emitting unit 225*b* represents a light emitting unit in the non-light emitting state.

Figure 23:
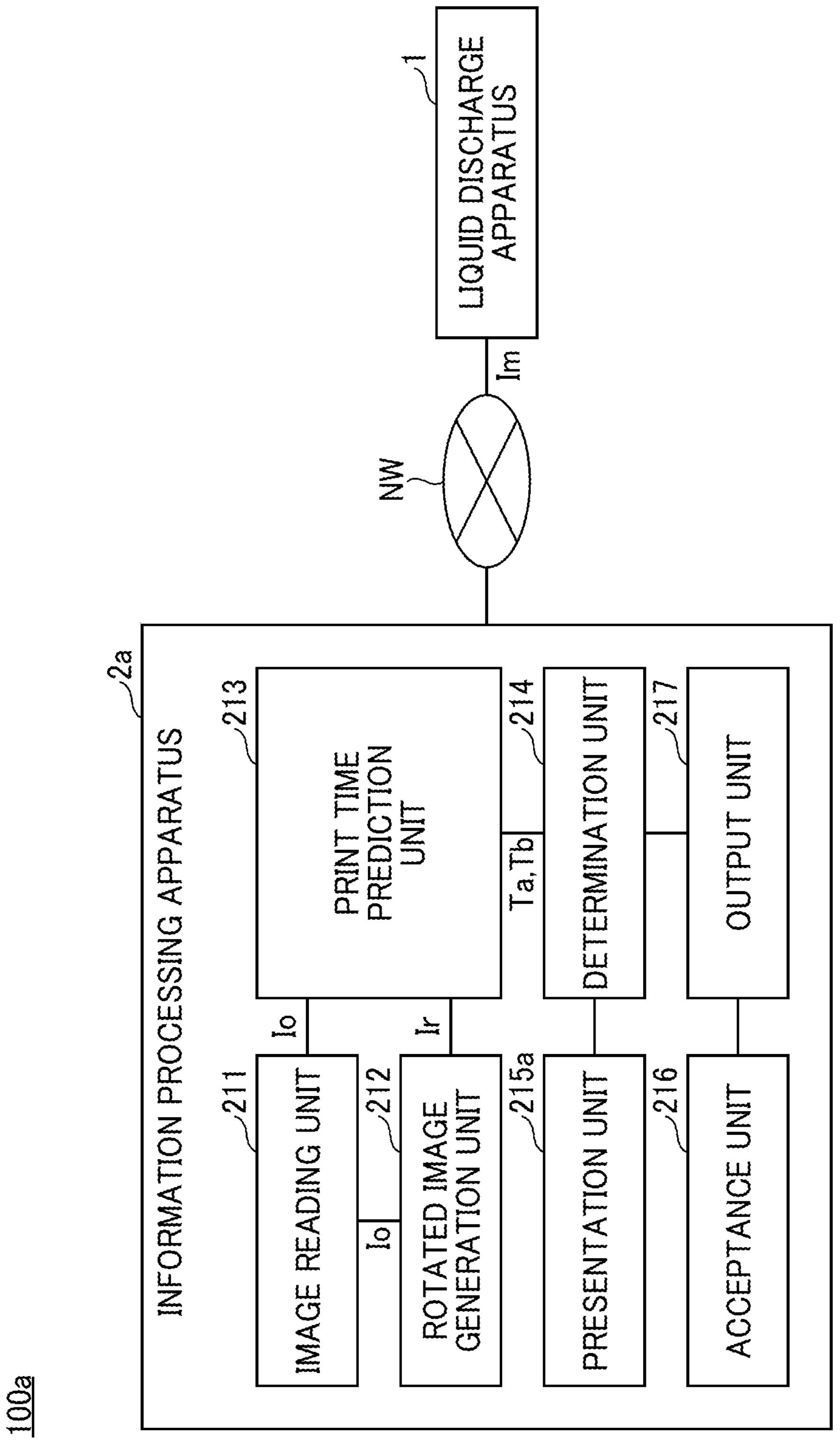
FIG. 23 is a diagram of an exemplary functional configuration of an information processing apparatus according to the second embodiment.

FIG. 23 is a block diagram illustrating an example of a functional configuration of an information processing apparatus 2*a* according to the second embodiment. The information processing apparatus 2*a* includes a presentation unit 215*a*. The information processing apparatus 2*a* realizes the function of the presentation unit 215*a* by a CPU 201 executing a predetermined program.

The presentation unit 215*a* presents the position and direction of the garment G to be placed on the platen 22*a* by controlling light emission by the light emitting units 225. For example, according to the position and direction of the garment G determined by the determination unit 214, the presentation unit 215*a* causes the light emitting units 225 of the block bodies 220*a* corresponding to the end positions of the garment G to be placed on a placement surface 22A of the platen 22*a* to emit light, and does not cause the light emitting units 225 of the block bodies 220*a* corresponding to positions other than the end positions of the garment G to emit light.

The user places the garment G on the placement surface 22A of the platen 22*a* such that the end portions of the garment G are positioned at the positions of the block bodies 220*a* that emit light. Then, the user presses the light-emitting block bodies 220*a* in the −Z direction, so that the platen 22*a* can fix the garment G using pressing members 222.

Figure 24:
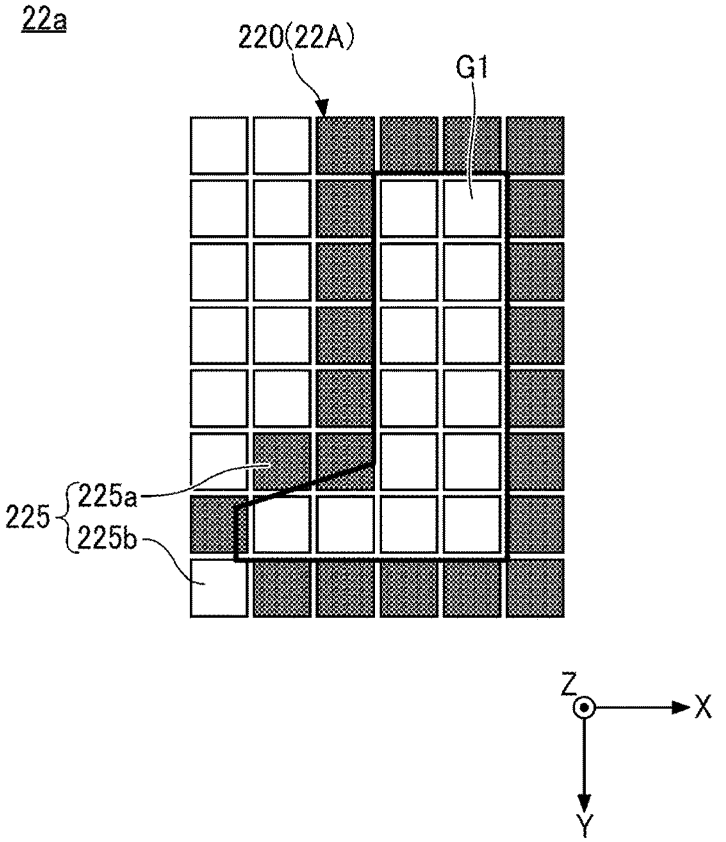
FIG. 24 is a view of a first placement example of the platen according to the second embodiment.
Figure 25:
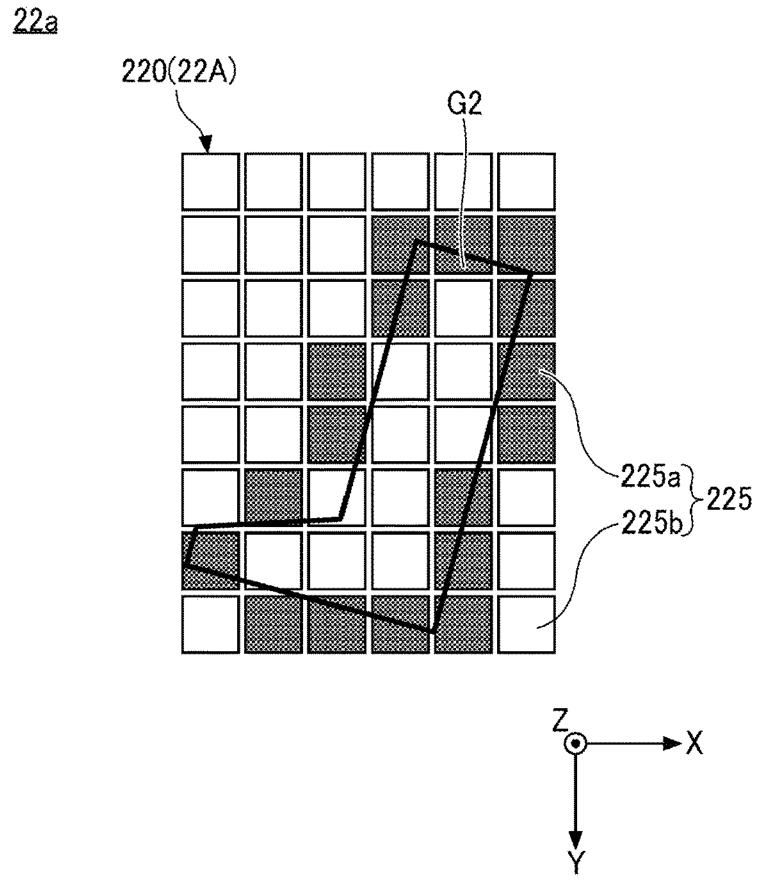
FIG. 25 is a view of a second placement example of the platen according to the second embodiment.

FIGS. 24 and 25 are diagrams illustrating examples of placement of the garment G on the platen 22*a*. FIG. 24 illustrates a first example, and FIG. 25 illustrates a second example.

As illustrated in FIGS. 24 and 25, the light emitting units 225*a* corresponding to the end positions of the garments G1 and G2 to be placed on the placement surface 22A emit light, and the light emitting units 225*b* at positions other than the end positions do not emit light. The user can easily recognize the positions and the directions of the garments G1 and G2 based on the light emission by the light emitting units 225*a*, and can easily place the garments G1 and G2 on the placement surface 22A at the positions and the directions in which the print time can be shortened. Accordingly, it is possible to provide the printing system 100*a* capable of shortening the print time. The advantageous effects other than those described above are the same as those described in relation to the first embodiment.

Embodiments of the present disclosure has been described above. However, the present disclosure is not limited to such a specific embodiment, and various modifications and changes can be made within the scope of the gist of the present disclosure described in the claims.

In the above-described embodiments, the head 30 is moved relative to the garment G by the movement of the carriage 13 as an example. However, the present disclosure is not limited to this configuration. The head 30 may be moved relative to the garment G by moving the garment G, instead of moving the carriage 13.

An embodiment of the present disclosure includes a liquid discharge method. For example, the liquid discharge method is a liquid discharge method used by a liquid discharge apparatus that discharges a liquid based on image data to print an image on a print medium. The liquid discharge method includes placing the print medium on a placement member of the liquid discharge apparatus; and presenting, by a presentation unit, a position and direction of the print medium having the shortest print time determined based on original image data that is a source of the image data, among positions and directions of the print medium to be placed on the placement member. According to such a liquid discharge method, the same advantageous effects as those of the liquid discharge apparatus 1 described above can be obtained.

The numbers used in the description of the embodiments, such as ordinal numbers and numerical values that indicates quantity, are all given by way of example to describe the technologies to implement the embodiments of the present disclosure, and the present disclosure is not limited to the numbers given in the above description. In addition, the connection relationships between the components are exemplified to specifically describe the technologies of the present disclosure, and the connection relationships for realizing the functions of the present disclosure are not limited to the exemplified connection relationships.

Each function of the embodiment described above can be realized by one or multiple processing circuitry. Here, the "processing circuitry" in the present specification includes a processor programmed to execute each function by software like a processor implemented by an electronic circuit, and a device such as an application specific integrated circuit (ASIC), a digital signal processor (DSP), a field programmable gate array (FPGA), or a conventional circuitry module designed to execute each function described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Aspect 1

A liquid discharge method includes: calculating a first print time to print original image data (Io) on a print medium (G); generating rotated image data (Ir) by rotating the original image data (Io) by a predetermined angle; calculating a second print time to print the rotated image data (Ir) on the print medium (G); comparing the first print time and the second print time to determine whether the first print time is larger than the second print time; generating print image data (Im) according to the rotated image data (Ir) in response to a determination in which the first print time is larger than the second print time; generating print image data (Im) according to the original image data (Io) in response to a determination in which the first print time is smaller than the second print time; displaying a position and a direction of the print medium based on the print image data (Im); and outputting the print image data (Im) to a liquid discharge apparatus to cause the liquid discharge apparatus to discharge a liquid onto the print medium based on the print image data (Im).

Aspect 2

In the liquid discharge method according to Aspect 1, the displaying displays the position and the direction of the print medium on a placement member (22) on which the print medium is placed.

Aspect 3

In the liquid discharge method according to Aspect 2, the displaying causes the placement member (22) including multiple block bodies each including a light emitting unit to emit a light to display the position and direction of the print medium on the placement member.

Aspect 4

A non-transitory recording medium storing a program for causing circuitry to execute the liquid discharge method according to Aspect 1. The USB memory may be used as the non-transitory recording medium.

Aspect 5

A liquid discharge apparatus includes: a head (30) configured to discharge a liquid onto a print medium based on image data; a placement member (22) including a placement surface on which the print medium is to be placed; and circuitry (2) configured to: calculating a first print time to print original image data (Io) on a print medium (G); generating rotated image data (Ir) by rotating the original image data (Io) by a predetermined angle; calculating a second print time to print the rotated image data (Ir) on the print medium (G); comparing the first print time and the second print time to determine whether the first print time is larger than the second print time; generating print image data (Im) according to the rotated image data (Ir) in response to a determination in which the first print time is larger than the second print time; generating print image data (Im) according to the original image data (Io) in response to a determination in which the first print time is smaller than the second print time; displaying a position and a direction of the print medium based on the print image data (Im); and discharging a liquid onto the print medium based on the print image data (Im).

Aspect 6

In the liquid discharge apparatus according to Aspect 5, the placement member (22) includes a multiple block bodies (220*a*), a height of each of which is changeable to change a shape of the placement surface of the multiple block bodies (220*a*) according to a shape of the print medium (G).

Aspect 7

In the liquid discharge apparatus according to Aspect 4, the multiple block bodies respectively include light emitting units (225), and the circuitry (2) causes the light emitting units (225) to emit lights to display the position and direction of the print medium on the placement member (22).

Each of the functions of the described embodiments such as the information processing apparatus 2 or the CPU 201 may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge method comprising:

calculating a first print time to print original image data on a print medium;

generating rotated image data by rotating the original image data by a predetermined angle;

calculating a second print time to print the rotated image data on the print medium;

comparing the first print time and the second print time to determine whether the first print time is larger than the second print time;

generating print image data according to the rotated image data in response to a determination in which the first print time is larger than the second print time;

generating print image data according to the original image data in response to a determination in which the first print time is smaller than the second print time;

displaying a position and a direction of the print medium based on the print image data; and outputting the print image data to a liquid discharge apparatus to cause the liquid discharge apparatus to discharge a liquid onto the print medium based on the print image data, wherein the displaying displays the position and the direction of the print medium on a placement member on which the print medium is placed, and wherein the displaying causes the placement member including multiple block bodies each including a light emitting unit to emit a light to display the position and direction of the print medium on the placement member.

2. A non-transitory recording medium storing a program for causing circuitry to execute the liquid discharge method according to claim 1.

3. A liquid discharge apparatus comprising:

a head configured to discharge a liquid onto a print medium based on image data, a placement member including a placement surface on which the print medium is to be placed; and circuitry configured to:

calculating a first print time to print original image data on a print medium;

generating rotated image data by rotating the original image data by a predetermined angle;

calculating a second print time to print the rotated image data on the print medium;

comparing the first print time and the second print time to determine whether the first print time is larger than the second print time;

generating print image data according to the rotated image data in response to a determination in which the first print time is larger than the second print time;

generating print image data according to the original image data in response to a determination in which the first print time is smaller than the second print time;

displaying a position and a direction of the print medium based on the print image data; and discharging a liquid onto the print medium based on the print image data, wherein the placement member includes multiple block bodies, a height of each of which is changeable to change a shape of the placement surface of the multiple block bodies according to a shape of the print medium, and wherein the multiple block bodies respectively include light emitting units, and the circuitry causes the light emitting units to emit lights to display the position and direction of the print medium on the placement member.

* * * * *